(12) United States Patent
Liang et al.

(10) Patent No.: US 11,381,989 B2
(45) Date of Patent: Jul. 5, 2022

(54) COMMUNICATION METHOD AND APPARATUS

(71) Applicant: Huawei Technologies Co., Ltd., Shenzhen (CN)

(72) Inventors: Jinyao Liang, Shenzhen (CN); Ting Wang, Shanghai (CN); Yuanjie Li, Shanghai (CN); Liuliu Ji, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 16/849,404

(22) Filed: Apr. 15, 2020

(65) Prior Publication Data

US 2020/0245178 A1 Jul. 30, 2020

Related U.S. Application Data

(63) Continuation of application No. PCT/CN2018/115425, filed on Nov. 14, 2018.

(30) Foreign Application Priority Data

Nov. 17, 2017 (CN) .......................... 201711149028.1

(51) Int. Cl.
*H04W 24/10* (2009.01)
*H04W 24/08* (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

| 9,954,589 | B2 * | 4/2018 | Liu ...................... H04B 7/0626 |
| 10,020,860 | B2 | 7/2018 | Onggosanusi et al. |
| 10,129,781 | B2 * | 11/2018 | Frenne ................... H04W 24/10 |
| 10,225,054 | B2 * | 3/2019 | Shin ........................ H04L 5/0051 |

(Continued)

FOREIGN PATENT DOCUMENTS

| CN | 103716818 A | 4/2014 |
| CN | 106464318 A | 2/2017 |

(Continued)

OTHER PUBLICATIONS

Samsung et al., "WF on CRI Definition", 3GPP TSG RAN WG1 88, R1-1703603, Feb. 13-17, 2017, 3 pages, Athens, Greece.

(Continued)

*Primary Examiner* — Tri H Phan
(74) *Attorney, Agent, or Firm* — Slater Matsil, LLP

(57) ABSTRACT

A method includes: receiving, by a network device, k channel measurement values, k channel measurement resource identifiers, and k interference measurement resource identifiers that are sent by user equipment, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

16 Claims, 10 Drawing Sheets

(56) References Cited

U.S. PATENT DOCUMENTS

| | | | |
|---|---|---|---|
| 10,560,859 B2* | 2/2020 | Li | H04L 5/0091 |
| 2014/0334391 A1 | 11/2014 | Khoshnevis et al. | |
| 2015/0280877 A1 | 10/2015 | Chen et al. | |
| 2015/0319633 A1 | 11/2015 | Ji et al. | |
| 2016/0006553 A1* | 1/2016 | Kim | H04L 1/1864 |
| | | | 370/252 |
| 2016/0301505 A1 | 10/2016 | Furuskog et al. | |
| 2019/0173549 A1* | 6/2019 | Liang | H04L 41/0803 |
| 2019/0297519 A1* | 9/2019 | Han | H04L 5/0032 |
| 2020/0015109 A1 | 1/2020 | Frenne et al. | |
| 2020/0052764 A1 | 2/2020 | Liang | |

FOREIGN PATENT DOCUMENTS

| | | | |
|---|---|---|---|
| CN | 106797649 A | 5/2017 | |
| CN | 107005293 A | 8/2017 | |
| CN | 107005299 A | 8/2017 | |
| EP | 2582084 A2 | 4/2013 | |
| GB | 2512634 A | 10/2014 | |
| WO | 2014067341 A1 | 5/2014 | |

OTHER PUBLICATIONS

Intel Corporation, "On NR CSI framework", 3GPP TSG RAN WG1 #88bis, R1-1704727, Apr. 3-7, 2017, 7 pages, Spokane, USA.

Ericsson, "Further Details of CSI Framework", 3GPP TSG-RAN WG1 #88bis, R1-1705895, Apr. 3-7, 2017, 7 pages, Spokane, USA.

Ericsson, "CSI feedback for multi-TRP", 3GPP TSG-RAN WG1 #90, R1-1714286, Aug. 21-25, 2017, 9 pages, Prague, Czech Republic.

Ericsson, "On CSI measurement", 3GPP TSG-RAN WG1 #90bis, R1-1718431, Oct. 9-13, 2017, 12 pages, Prague, Czech Republic.

Ericsson, "Identifying bounds on parameters in CSI framework", 3GPP TSG-RAN WG1 #89ah-NR, R1-1711034, Qingdao, China, Jun. 27-30, 2017, 11 pages.

Ericsson, "CSI feedback for multi-TRP", 3GPP TSG RAN WG1 Meeting 90bis, R1-1718737, Prague, CZ, Oct. 9-13, 2017, 9 pages.

Samsung, "CSI Reporting for Reciprocity-based Operation", 3GPP TSG RAN WG1 90bis, Prague, CZ, R1-1717609, Oct. 9-13, 2017, 4 pages.

* cited by examiner

COMMUNICATION METHOD AND APPARATUS

CROSS-REFERENCE TO RELATED APPLICATIONS

This application is a continuation of International Application No. PCT/CN2018/115425, filed on Nov. 14, 2018, which claims priority to Chinese Patent Application No. 201711149028.1, filed on Nov. 17, 2017. The disclosures of the aforementioned applications are hereby incorporated by reference in their entireties.

TECHNICAL FIELD

This application relates to the field of communications technologies, and in particular, to a communication method and an apparatus.

BACKGROUND

In a communications system, a base station may configure a channel state information-reference signal (CSI-RS) for user equipment (UE), and the UE performs measurement based on the received reference signal to obtain channel state information (CSI), and feeds back the channel state information to the base station. The base station selects a modulation and coding scheme, performs resource scheduling, and so on based on the obtained channel state information.

In new radio (NR) in a 5G communications system, a base station may configure a plurality of resources for a CSI-RS, some resources may be used for channel measurement, and some resources may be used for interference (e.g., interference measurement). UE can obtain a plurality of channel measurement values after performing measurement based on the plurality of resources, and feed back the plurality of channel measurement values to the base station. In this case, the base station cannot determine resources based on which the channel measurement values are obtained through measurement.

SUMMARY

This application provides a communication method and an apparatus, so that a base station can determine a resource corresponding to a channel measurement value.

According to a first aspect, a communication method is provided. The method includes: receiving, by a network device, k channel measurement values, k channel measurement resource identifiers, and k interference measurement resource identifiers that are sent by user equipment, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

According to the foregoing solution, the user equipment feeds back the channel measurement value and the corresponding channel measurement resource identifier and interference measurement resource identifier to a base station, and the base station may determine, based on the channel measurement resource identifier and the interference measurement resource identifier, resources based on which the channel measurement values are calculated.

With reference to the first aspect, in a first possible implementation, the channel measurement value includes at least one of the following: a channel quality indicator CQI, a precoding matrix indicator PMI, and a rank indicator RI.

With reference to the first aspect or the first possible implementation of the first aspect, in a second possible implementation, before the receiving, by the network device, the k channel measurement values, the method further includes: sending, by the network device, first instruction information to the user equipment, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the first aspect or the first possible implementation of the first aspect, in a third possible implementation, before the receiving, by the network device, the k channel measurement values, the method further includes: sending, by the network device, second instruction information to the user equipment, where the second instruction information instructs the user equipment to feed back the k channel measurement values.

According to a second aspect, a communication method is provided. The method includes: sending, by user equipment, k channel measurement values, k channel measurement resource identifiers, and k interference measurement resource identifiers to a network device, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

With reference to the second aspect, in a first possible implementation, the channel measurement value includes at least one of the following: a channel quality indicator CQI, a precoding matrix indicator PMI, and a rank indicator RI.

With reference to the second aspect or the first possible implementation of the second aspect, in a second possible implementation, before the sending, by the user equipment, the k channel measurement values, the method further includes: receiving, by the user equipment, first instruction information sent by the network device, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the second aspect or the first possible implementation of the second aspect, in a third possible implementation, before the sending, by the user equipment, the k channel measurement values, the method further includes: receiving, by the user equipment, second instruction information sent by the network device, where the second instruction information instructs the user equipment to feed back the k channel measurement values.

According to a third aspect, a network device is provided, and includes: a transceiver, configured to receive k channel measurement values, k channel measurement resource identifiers, and k interference measurement resource identifiers that are sent by user equipment, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value; and a processor, configured to obtain the k channel measurement values, the k channel measurement resource identifiers, and the k interference measurement resource identifiers.

With reference to the third aspect, in a first possible implementation, the channel measurement value includes at least one of the following: a channel quality indicator CQI, a precoding matrix indicator PMI, and a rank indicator RI.

With reference to the third aspect or the first possible implementation of the third aspect, in a second possible implementation, the transceiver is further configured to: before receiving the k channel measurement values, send first instruction information to the user equipment, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the third aspect or the first possible implementation of the third aspect, in a third possible implementation, the transceiver is further configured to: before receiving the k channel measurement values, send second instruction information to the user equipment, where the second instruction information instructs the user equipment to feed back the k channel measurement values.

According to a fourth aspect, user equipment is provided, and includes: a processor, configured to calculate k channel measurement values; and a transceiver, configured to send the k channel measurement values, k channel measurement resource identifiers, and k interference measurement resource identifiers to a network device, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

With reference to the fourth aspect, in a first possible implementation, the channel measurement value includes at least one of the following: a channel quality indicator CQI, a precoding matrix indicator PMI, and a rank indicator RI.

With reference to the fourth aspect or the first possible implementation of the fourth aspect, in a second possible implementation, the transceiver is further configured to: before sending the k channel measurement values, receive first instruction information sent by the network device, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the fourth aspect or the first possible implementation of the fourth aspect, in a third possible implementation, the transceiver is further configured to: before sending the k channel measurement values, receive second instruction information sent by the network device, where the second instruction information instructs the user equipment to feed back the k channel measurement values.

According to a fifth aspect, a network device is provided, and includes: a transceiver unit, configured to receive k channel measurement values, k channel measurement resource identifiers, and k interference measurement resource identifiers that are sent by user equipment, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value; and a processing unit, configured to obtain the k channel measurement values, the k channel measurement resource identifiers, and the k interference measurement resource identifiers.

With reference to the fifth aspect, in a first possible implementation, the channel measurement value includes at least one of the following: a channel quality indicator CQI, a precoding matrix indicator PMI, and a rank indicator RI.

With reference to the fifth aspect or the first possible implementation of the fifth aspect, in a second possible implementation, the transceiver unit is further configured to: before receiving the k channel measurement values, send first instruction information to the user equipment, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the fifth aspect or the first possible implementation of the fifth aspect, in a third possible implementation, the transceiver unit is further configured to: before receiving the k channel measurement values, send second instruction information to the user equipment, where the second instruction information instructs the user equipment to feed back the k channel measurement values.

According to a sixth aspect, user equipment is provided, and includes: a processing unit, configured to calculate k channel measurement values; and a transceiver unit, configured to send the k channel measurement values, k channel measurement resource identifiers, and k interference measurement resource identifiers to a network device, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

With reference to the sixth aspect, in a first possible implementation, the channel measurement value includes at least one of the following: a channel quality indicator CQI, a precoding matrix indicator PMI, and a rank indicator RI.

With reference to the sixth aspect or the first possible implementation of the sixth aspect, in a second possible implementation, the transceiver unit is further configured to: before sending the k channel measurement values, receive first instruction information sent by the network device, where the first instruction information instructs the user equipment to feed back a channel measurement value obtained based on Nc channel measurement resources and Ni interference measurement resources, Nc and Ni are integers greater than or equal to 1, and k=min{Nc, Ni}.

With reference to the sixth aspect or the first possible implementation of the sixth aspect, in a third possible implementation, the transceiver unit is further configured to: before sending the k channel measurement values, receive second instruction information sent by the network device, where the second instruction information instructs the user equipment to feed back the k channel measurement values.

According to a seventh aspect, a communication method is provided, and includes: receiving, by a network device, Ni interference measurement resource identifiers sent by user equipment and a channel measurement value corresponding to the Ni interference measurement resource identifiers, where the channel measurement value is obtained by the user equipment through measurement performed based on at least the Ni interference measurement resources, and Ni is an integer greater than or equal to 1.

In the foregoing solution, a base station receives the Ni interference measurement resource identifiers and the channel measurement value corresponding to the Ni interference measurement resource identifiers, to obtain the Ni interference measurement resource identifiers and the channel measurement value corresponding to the Ni interference measurement resource identifiers.

With reference to the seventh aspect, in a first possible implementation, the channel measurement value includes at least one of the following: a channel quality indicator CQI, a precoding matrix indicator PMI, and a rank indicator RI.

With reference to the seventh aspect or the first possible implementation of the seventh aspect, in a second possible implementation, before the receiving, by the network device, the channel measurement value, the method further includes: sending, by the network device, third instruction information to the user equipment, to instruct the user equipment to feed back the channel measurement value obtained through measurement performed based on the Ni interference measurement resources.

According to an eighth aspect, a communication method is provided, and includes: sending, by user equipment to a network device, Ni interference measurement resource identifiers and a channel measurement value corresponding to the Ni interference measurement resource identifiers, where the channel measurement value is obtained by the user equipment through measurement performed based on at least the Ni interference measurement resources, and Ni is an integer greater than or equal to 1.

With reference to the eighth aspect, in a first possible implementation, the channel measurement value includes at least one of the following: a channel quality indicator CQI, a precoding matrix indicator PMI, and a rank indicator RI.

With reference to the eighth aspect or the first possible implementation of the eighth aspect, in a second possible implementation, before the sending, by the user equipment, the channel measurement value, the method further includes: receiving, by the user equipment, third instruction information sent by the network device, where the third instruction information instructs the user equipment to feed back the channel measurement value obtained through measurement performed based on the Ni interference measurement resources.

According to a ninth aspect, a network device is provided, and includes: a transceiver, configured to receive Ni interference measurement resource identifiers sent by user equipment and a channel measurement value corresponding to the Ni interference measurement resource identifiers, where the channel measurement value is obtained by the user equipment through measurement performed based on at least the Ni interference measurement resources, and Ni is an integer greater than or equal to 1; and a processor, configured to obtain the Ni interference measurement resource identifiers and the channel measurement value corresponding to the Ni interference measurement resource identifiers.

With reference to the ninth aspect, in a first possible implementation, the channel measurement value includes at least one of the following: a channel quality indicator CQI, a precoding matrix indicator PMI, and a rank indicator RI.

With reference to the ninth aspect or the first possible implementation of the ninth aspect, in a second possible implementation, the transceiver is further configured to: before receiving the channel measurement value, send third instruction information to the user equipment, to instruct the user equipment to feed back the channel measurement value obtained through measurement performed based on the Ni interference measurement resources.

According to a tenth aspect, user equipment is provided, and includes: a processor, configured to calculate a channel measurement value; and a transceiver, configured to send, to a network device, Ni interference measurement resource identifiers and a channel measurement value corresponding to the Ni interference measurement resource identifiers, where the channel measurement value is obtained by the user equipment through measurement performed based on at least the Ni interference measurement resources, and Ni is an integer greater than or equal to 1.

With reference to the tenth aspect, in a first possible implementation, the channel measurement value includes at least one of the following: a channel quality indicator CQI, a precoding matrix indicator PMI, and a rank indicator RI.

With reference to the tenth aspect or the first possible implementation of the tenth aspect, in a second possible implementation, the transceiver is further configured to: before sending the channel measurement value, receive third instruction information sent by the network device, where the third instruction information instructs the user equipment to feed back the channel measurement value obtained through measurement performed based on the Ni interference measurement resources.

According to an eleventh aspect, a network device is provided, and includes: a transceiver unit, configured to receive Ni interference measurement resource identifiers sent by user equipment and a channel measurement value corresponding to the Ni interference measurement resource identifiers, where the channel measurement value is obtained by the user equipment through measurement performed based on at least the Ni interference measurement resources, and Ni is an integer greater than or equal to 1; and a processing unit, configured to obtain the Ni interference measurement resource identifiers and the channel measurement value corresponding to the Ni interference measurement resource identifiers.

With reference to the eleventh aspect, in a first possible implementation, the channel measurement value includes at least one of the following: a channel quality indicator CQI, a precoding matrix indicator PMI, and a rank indicator RI.

With reference to the eleventh aspect or the first possible implementation of the eleventh aspect, in a second possible implementation, the transceiver unit is further configured to: before receiving the channel measurement value, send third instruction information to the user equipment, to instruct the user equipment to feed back the channel measurement value obtained through measurement performed based on the Ni interference measurement resources.

According to a twelfth aspect, user equipment is provided, and includes a processing unit, configured to calculate a channel measurement value; and a transceiver unit, configured to send, to a network device, Ni interference measurement resource identifiers and a channel measurement value corresponding to the Ni interference measurement resource identifiers, where the channel measurement value is obtained by the user equipment through measurement performed based on at least the Ni interference measurement resources, and Ni is an integer greater than or equal to 1.

With reference to the twelfth aspect, in a first possible implementation, the channel measurement value includes at least one of the following: a channel quality indicator CQI, a precoding matrix indicator PMI, and a rank indicator RI.

With reference to the twelfth aspect or the first possible implementation of the twelfth aspect, in a second possible implementation, the transceiver unit is further configured to: before sending the channel measurement value, receive third instruction information sent by the network device, where the third instruction information instructs the user equipment to feed back the channel measurement value obtained through measurement performed based on the Ni interference measurement resources.

According to a thirteenth aspect, a communication method is provided, and includes: receiving, by a network device, Nc channel measurement resource identifiers sent by user equipment and a channel measurement value corresponding to the Nc channel measurement resource identifiers, where the channel measurement value is obtained by the user equipment through measurement performed based on at least the Nc channel measurement resources, and Nc is an integer greater than or equal to 1.

In the foregoing solution, a base station receives the Nc channel measurement resource identifiers and the channel measurement value corresponding to the Nc channel measurement resource identifiers, to obtain the Nc channel measurement resource identifiers and the channel measurement value corresponding to the Nc channel measurement resource identifiers.

With reference to the thirteenth aspect, in a first possible implementation, the channel measurement value includes at least one of the following: a channel quality indicator CQI, a precoding matrix indicator PMI, and a rank indicator RI.

With reference to the thirteenth aspect or the first possible implementation of the thirteenth aspect, in a second possible implementation, before the receiving, by the network device, the channel measurement value, the method further includes: sending, by the network device, fourth instruction information to the user equipment, to instruct the user equipment to feed back the channel measurement value obtained based on the Nc channel measurement resources.

According to a fourteenth aspect, a communication method is provided, and includes: sending, by user equipment to a network device, Nc channel measurement resource identifiers and a channel measurement value corresponding to the Nc channel measurement resource identifiers, where the channel measurement value is obtained by the user equipment through measurement performed based on at least the Nc channel measurement resources, and Nc is an integer greater than or equal to 1.

With reference to the fourteenth aspect, in a first possible implementation, the channel measurement value includes at least one of the following: a channel quality indicator CQI, a precoding matrix indicator PMI, and a rank indicator RI.

With reference to the fourteenth aspect or the first possible implementation of the fourteenth aspect, in a second possible implementation, before the sending, by the user equipment, the channel measurement value, the method further includes: receiving, by the user equipment, fourth instruction information sent by the network device, where the fourth instruction information instructs the user equipment to feed back the channel measurement value obtained based on the Nc channel measurement resources.

According to a fifteenth aspect, a network device is provided, and includes: a transceiver, configured to receive Nc channel measurement resource identifiers sent by user equipment and a channel measurement value corresponding to the Nc channel measurement resource identifiers, where the channel measurement value is obtained by the user equipment through measurement performed based on at least the Nc channel measurement resources, and Nc is an integer greater than or equal to 1; and a processor, configured to obtain the Nc channel measurement resource identifiers and the channel measurement value corresponding to the Nc channel measurement resource identifiers.

With reference to the fifteenth aspect, in a first possible implementation, the channel measurement value includes at least one of the following: a channel quality indicator CQI, a precoding matrix indicator PMI, and a rank indicator RI.

With reference to the fifteenth aspect or the first possible implementation of the fifteenth aspect, in a second possible implementation, the transceiver is further configured to: before receiving the channel measurement value, send fourth instruction information to the user equipment, to instruct the user equipment to feed back the channel measurement value obtained based on the Nc channel measurement resources.

According to a sixteenth aspect, user equipment is provided, and includes: a processor, configured to calculate a channel measurement value corresponding to Nc channel measurement resource identifiers; and a transceiver, configured to send, to a network device, the Nc channel measurement resource identifiers and the channel measurement value corresponding to the Nc channel measurement resource identifiers, where the channel measurement value is obtained by the user equipment through measurement performed based on at least the Nc channel measurement resources, and Nc is an integer greater than or equal to 1.

With reference to the sixteenth aspect, in a first possible implementation, the channel measurement value includes at least one of the following: a channel quality indicator CQI, a precoding matrix indicator PMI, and a rank indicator RI.

With reference to the sixteenth aspect or the first possible implementation of the sixteenth aspect, in a second possible implementation, the transceiver is further configured to: before sending the channel measurement value, receive fourth instruction information sent by the network device, where the fourth instruction information instructs the user equipment to feed back the channel measurement value obtained based on the Nc channel measurement resources.

According to a seventeenth aspect, a network device is provided, and includes: a transceiver unit, configured to receive Nc channel measurement resource identifiers sent by user equipment and a channel measurement value corresponding to the Nc channel measurement resource identifiers, where the channel measurement value is obtained by the user equipment through measurement performed based on at least the Nc channel measurement resources, and Nc is an integer greater than or equal to 1; and a processing unit, configured to obtain the Nc channel measurement resource identifiers and the channel measurement value corresponding to the Nc channel measurement resource identifiers.

With reference to the seventeenth aspect, in a first possible implementation, the channel measurement value includes at least one of the following: a channel quality indicator CQI, a precoding matrix indicator PMI, and a rank indicator RI.

With reference to the seventeenth aspect or the first possible implementation of the seventeenth aspect, in a second possible implementation, the transceiver unit is further configured to: before receiving the channel measurement value, send fourth instruction information to the user equipment, to instruct the user equipment to feed back the channel measurement value obtained based on the Nc channel measurement resources.

According to an eighteenth aspect, user equipment is provided, and includes: a processing unit, configured to calculate a channel measurement value corresponding to Nc channel measurement resource identifiers; and a transceiver unit, configured to send, to a network device, the Nc channel measurement resource identifiers and the channel measurement value corresponding to the Nc channel measurement resource identifiers, where the channel measurement value is obtained by the user equipment through measurement performed based on at least the Nc channel measurement resources, and Nc is an integer greater than or equal to 1.

With reference to the eighteenth aspect, in a first possible implementation, the channel measurement value includes at least one of the following: a channel quality indicator CQI, a precoding matrix indicator PMI, and a rank indicator RI.

With reference to the eighteenth aspect or the first possible implementation of the eighteenth aspect, in a second possible implementation, the transceiver unit is further configured to: before sending the channel measurement value, receive fourth instruction information sent by the network device, where the fourth instruction information instructs the user equipment to feed back the channel measurement value obtained based on the Nc channel measurement resources.

According to a nineteenth aspect, a communication method is provided, and includes: receiving, by a network device, k channel measurement values sent by user equipment, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

In the foregoing solution, a base station receives the k channel measurement values and the channel measurement resource identifiers and the interference measurement resource identifiers that correspond to the channel measurement values, to obtain the k channel measurement values corresponding to the channel measurement resource identifiers and the interference measurement resource identifiers.

With reference to the nineteenth aspect, in a first possible implementation, the channel measurement value includes at least one of the following: a channel quality indicator CQI, a precoding matrix indicator PMI, and a rank indicator RI.

With reference to the nineteenth aspect or the first possible implementation of the nineteenth aspect, in a second possible implementation, before the receiving, by the network device, the k channel measurement values, the method further includes: sending, by the network device, fifth instruction information to the user equipment, where the fifth instruction information instructs the user equipment to feed back a channel measurement value obtained based on Nc channel measurement resources and Ni interference measurement resources, and k is calculated based on Nc and Ni.

With reference to the nineteenth aspect or the first possible implementation of the nineteenth aspect, in a third possible implementation, before the receiving, by the network device, the k channel measurement values, the method further includes: sending, by the network device, seventh instruction information to the user equipment, where the seventh instruction information instructs the user equipment to feed back the k channel measurement values.

With reference to the nineteenth aspect or any implementation of the nineteenth aspect, in a fourth possible implementation, the method further includes: receiving, by the network device, m and n that are sent by the user equipment.

According to a twentieth aspect, a communication method is provided, and includes sending, by user equipment to a network device, k channel measurement values, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

With reference to the twentieth aspect, in a first possible implementation, the channel measurement value includes at least one of the following: a channel quality indicator CQI, a precoding matrix indicator PMI, and a rank indicator RI.

With reference to the twentieth aspect or the first possible implementation of the twentieth aspect, in a second possible implementation, before the sending, by the user equipment, the k channel measurement values to the network device, the method further includes: receiving, by the user equipment, fifth instruction information sent by the network device, where the fifth instruction information instructs the user equipment to feed back a channel measurement value obtained based on Nc channel measurement resources and Ni interference measurement resources, and k is calculated based on Nc and Ni.

With reference to the twentieth aspect or the first possible implementation of the twentieth aspect, in a third possible implementation, before the sending, by the user equipment, the k channel measurement values, the method further includes: receiving, by the user equipment, seventh instruction information sent by the network device, where the seventh instruction information instructs the user equipment to feed back the k channel measurement values.

With reference to the twentieth aspect or any implementation of the twentieth aspect, in a fourth possible implementation, the method further includes: sending, by the user equipment, m and n to the network device.

According to a twenty-first aspect, a network device is provided, and includes: a transceiver, configured to receive k channel measurement values sent by user equipment, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1; and a processor, configured to obtain the k channel measurement values, and the channel measurement resource identifiers and the interference measurement resource identifiers that correspond to the channel measurement values.

With reference to the twenty-first aspect, in a first possible implementation, the channel measurement value includes at least one of the following: a channel quality indicator CQI, a precoding matrix indicator PMI, and a rank indicator RI.

With reference to the twenty-first aspect or the first possible implementation of the twenty-first aspect, in a second possible implementation, the transceiver is further configured to: before receiving the k channel measurement values, send fifth instruction information to the user equipment, where the fifth instruction information instructs the user equipment to feed back a channel measurement value obtained based on Nc channel measurement resources and Ni interference measurement resources, and k is calculated based on Nc and Ni.

With reference to the twenty-first aspect or the first possible implementation of the twenty-first aspect, in a third possible implementation, the transceiver is further configured to: before receiving the k channel measurement values, send seventh instruction information to the user equipment, where the seventh instruction information instructs the user equipment to feed back the k channel measurement values.

With reference to the twenty-first aspect or any implementation of the twenty-first aspect, in a fourth possible implementation, the transceiver is further configured to receive m and n that are sent by the user equipment.

According to a twenty-second aspect, user equipment is provided, and includes: a processor, configured to calculate k channel measurement values; and a transceiver, configured to send, to a network device, the k channel measurement values, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

With reference to the twenty-second aspect, in a first possible implementation, the channel measurement value includes at least one of the following: a channel quality indicator CQI, a precoding matrix indicator PMI, and a rank indicator RI.

With reference to the twenty-second aspect or the first possible implementation of the twenty-second aspect, in a second possible implementation, the transceiver is further configured to: before sending the k channel measurement values to the network device, receive fifth instruction information sent by the network device, where the fifth instruction information instructs the user equipment to feed back a channel measurement value obtained based on Nc channel measurement resources and Ni interference measurement resources, and k is calculated based on Nc and Ni.

With reference to the twenty-second aspect or the first possible implementation of the twenty-second aspect, in a third possible implementation, the transceiver is further configured to: before sending the k channel measurement values to the network device, receive seventh instruction information sent by the network device, where the seventh instruction information instructs the user equipment to feed back the k channel measurement values.

With reference to the twenty-second aspect or any implementation of the twenty-second aspect, in a fourth possible implementation, the transceiver is further configured to send m and n to the network device.

According to a twenty-third aspect, a network device is provided, and includes: a transceiver unit, configured to receive k channel measurement values sent by user equipment, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1; and a processing unit, configured to obtain the k channel measurement values, and the channel measurement resource identifiers and the interference measurement resource identifiers that correspond to the channel measurement values.

With reference to the twenty-third aspect, in a first possible implementation, the channel measurement value includes at least one of the following: a channel quality indicator CQI, a precoding matrix indicator PMI, and a rank indicator RI.

With reference to the twenty-third aspect or the first possible implementation of the twenty-third aspect, in a second possible implementation, the transceiver unit is further configured to: before receiving the k channel measurement values, send fifth instruction information to the user equipment, where the fifth instruction information instructs the user equipment to feed back a channel measurement value obtained based on Nc channel measurement resources and Ni interference measurement resources, and k is calculated based on Nc and Ni.

With reference to the twenty-third aspect or the first possible implementation of the twenty-third aspect, in a third possible implementation, the transceiver unit is further configured to: before receiving the k channel measurement values, send seventh instruction information to the user equipment, where the seventh instruction information instructs the user equipment to feed back the k channel measurement values.

With reference to the twenty-third aspect or any implementation of the twenty-third aspect, in a fourth possible implementation, the transceiver unit is further configured to receive m and n that are sent by the user equipment.

According to a twenty-fourth aspect, user equipment is provided, and includes: a processing unit, configured to calculate k channel measurement values; and a transceiver unit, configured to send, to a network device, the k channel measurement values, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

With reference to the twenty-fourth aspect, in a first possible implementation, the channel measurement value includes at least one of the following: a channel quality indicator CQI, a precoding matrix indicator PMI, and a rank indicator RI.

With reference to the twenty-fourth aspect or the first possible implementation of the twenty-fourth aspect, in a second possible implementation, the transceiver unit is further configured to: before sending the k channel measurement values to the network device, receive fifth instruction information sent by the network device, where the fifth instruction information instructs the user equipment to feed back a channel measurement value obtained based on Nc channel measurement resources and Ni interference measurement resources, and k is calculated based on Nc and Ni.

With reference to the twenty-fourth aspect or the first possible implementation of the twenty-fourth aspect, in a third possible implementation, the transceiver unit is further configured to: before sending the k channel measurement values to the network device, receive seventh instruction information sent by the network device, where the seventh instruction information instructs the user equipment to feed back the k channel measurement values.

With reference to the twenty-fourth aspect or any implementation of the twenty-fourth aspect, in a fourth possible implementation, the transceiver unit is further configured to send m and n to the network device.

According to a twenty-fifth aspect, a communication method is provided, and includes: receiving, by a network device, k channel measurement values sent by user equipment, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

In the foregoing solution, a base station receives the k channel measurement values and the index of the resource identifier group including the channel measurement resource identifiers and the interference measurement resource identifiers that correspond to the channel measurement values, to obtain the channel measurement values corresponding to the channel measurement resource identifiers and the interference measurement resource identifiers in the resource identifier group corresponding to the index.

With reference to the twenty-fifth aspect, in a first possible implementation, the channel measurement value includes at least one of the following: a channel quality indicator CQI, a precoding matrix indicator PMI, and a rank indicator RI.

With reference to the twenty-fifth aspect or the first possible implementation of the twenty-fifth aspect, in a second possible implementation, before the receiving, by the network device, the k channel measurement value, the method further includes: sending, by the network device, sixth instruction information to the user equipment, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

According to a twenty-sixth aspect, a communication method is provided, and includes: sending, by user equipment to a network device, k channel measurement values, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

With reference to the twenty-sixth aspect, in a first possible implementation, the channel measurement value includes at least one of the following: a channel quality indicator CQI, a precoding matrix indicator PMI, and a rank indicator RI.

With reference to the twenty-sixth aspect or the first possible implementation of the twenty-sixth aspect, in a second possible implementation, before the sending, by the user equipment, the k channel measurement values, the method further includes: receiving, by the user equipment, sixth instruction information sent by the network device, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

According to a twenty-seventh aspect, a network device is provided, and includes: a transceiver, configured to receive k channel measurement values sent by user equipment, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1; and a processor, configured to obtain the k channel measurement values, and the channel measurement resource identifiers and the interference measurement resource identifiers that correspond to the k channel measurement values.

With reference to the twenty-seventh aspect, in a first possible implementation, the channel measurement value includes at least one of the following: a channel quality indicator CQI, a precoding matrix indicator PMI, and a rank indicator RI.

With reference to the twenty-seventh aspect or the first possible implementation of the twenty-seventh aspect, in a second possible implementation, the transceiver is further configured to: before receiving the k channel measurement values, send sixth instruction information to the user equipment, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

According to twenty-eighth aspect, user equipment is provided, and includes: a processor, configured to calculate k channel measurement values; and a transceiver, configured to send, to a network device, the k channel measurement values, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

With reference to the twenty-eighth aspect, in a first possible implementation, the channel measurement value includes at least one of the following: a channel quality indicator CQI, a precoding matrix indicator PMI, and a rank indicator RI.

With reference to the twenty-eighth aspect or the first possible implementation of the twenty-eighth aspect, in a second possible implementation, the transceiver is further configured to: before sending the k channel measurement values, receive sixth instruction information sent by the network device, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

According to a twenty-ninth aspect, a network device is provided, and includes: a transceiver unit, configured to receive k channel measurement values sent by user equipment, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1; and a processing unit, configured to obtain the k channel measurement values, and the channel measurement resource identifiers and the interference measurement resource identifiers that correspond to the k channel measurement values.

With reference to the twenty-ninth aspect, in a first possible implementation, the channel measurement value includes at least one of the following: a channel quality indicator CQI, a precoding matrix indicator PMI, and a rank indicator RI.

With reference to the twenty-ninth aspect or the first possible implementation of the twenty-ninth aspect, in a second possible implementation, the transceiver unit is further configured to: before receiving the k channel measurement values, send sixth instruction information to the user equipment, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

According to a thirtieth aspect, user equipment is provided, and includes: a processing unit, configured to calculate k channel measurement values; and a transceiver unit, configured to send, to a network device, the k channel measurement values, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

With reference to the thirtieth aspect, in a first possible implementation, the channel measurement value includes at least one of the following: a channel quality indicator CQI, a precoding matrix indicator PMI, and a rank indicator RI.

With reference to the thirtieth aspect or the first possible implementation of the thirtieth aspect, in a second possible implementation, the transceiver unit is further configured to: before sending the k channel measurement values, receive sixth instruction information sent by the network device, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

In a possible design, the foregoing solutions implemented by the user equipment may be implemented by a chip.

In a possible design, the foregoing solutions implemented by the network device may be implemented by a chip.

In a possible design, the network device provided in this application may include a corresponding module configured to perform behavior of the network device in the foregoing method designs. The module may be software and/or hardware.

In a possible design, the user equipment provided in this application may include a corresponding module configured to perform behavior of the terminal in the foregoing method designs. The module may be software and/or hardware.

According to another aspect of this application, a computer-readable storage medium is provided. The computer-readable storage medium stores an instruction, and when the instruction is run on a computer, the computer is enabled to perform the method according to any one of the foregoing aspects.

According to another aspect of this application, a computer program product including an instruction is provided. When the computer program product is run on a computer, the computer is enabled to perform the method according to any one of the foregoing aspects.

BRIEF DESCRIPTION OF THE DRAWINGS

To describe the technical solutions in the embodiments of the present invention or in the current system more clearly, the following briefly describes the accompanying drawings required for describing the embodiments or the current system.

DETAILED DESCRIPTION OF ILLUSTRATIVE EMBODIMENTS

The following describes embodiments of the present invention in detail with reference to accompanying drawings. The network architecture and the service scenario described in the embodiments of the present invention are intended to describe the technical solutions in the embodiments of the present invention more clearly, and do not constitute a limitation on the technical solutions provided in the embodiments of the present invention. A person of ordinary skill in the art may know that: With the evolution of the network architecture and the emergence of new service scenarios, the technical solutions provided in the embodiments of the present invention are also applicable to similar technical problems.

Figure 1:
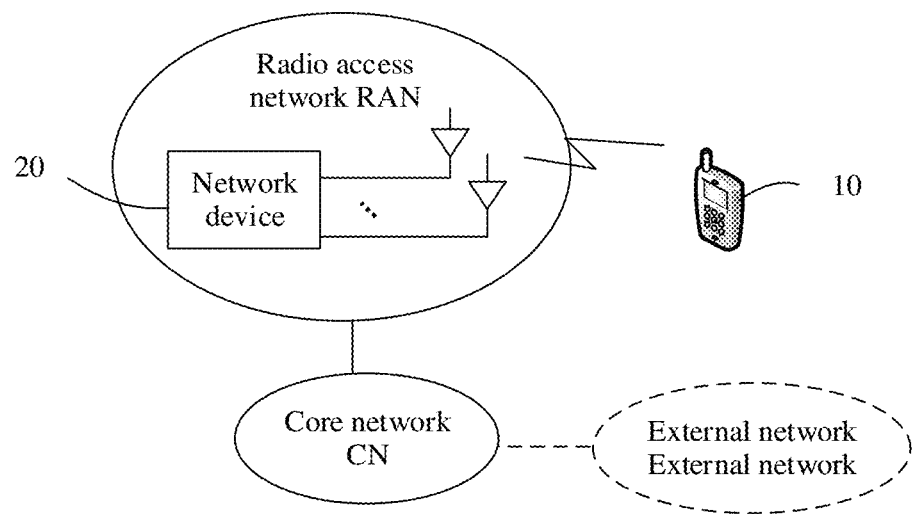
FIG. 1 is a schematic structural diagram of a possible system for implementing an embodiment of the present invention.

FIG. 1 is a schematic diagram of a possible system network in this application. As shown in FIG. 1, at least one terminal 10 communicates with a radio access network (Radio access network, RAN for short). The RAN includes at least one network device 20. For clarity, only one network device and one user equipment UE are shown in the figure. The RAN is connected to a core network (CN for short). Optionally, the CN may be coupled to one or more external networks such as the Internet and a public switched telephone network (PSTN for short).

To facilitate understanding, the following describes some nouns in this application.

In this application, nouns "network" and "system" are usually interchangeably used, but a person skilled in the art can understand meanings of the nouns. The user equipment (UE for short) is a terminal device having a communication function, may also be referred to as a terminal, and may include a handheld device, a vehicle-mounted device, a wearable device, or a computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are simply referred to as user equipment UE. The network device may be a device that has a wireless transceiver function, such as a base station (BS for short), a wireless access device in a cloud network, or a relay station. The base station may also be referred to as a base station device, and is a device deployed in a radio access network to provide a wireless communication function. The base station may have different names in different radio access systems. For example, the base station is referred to as a NodeB in a universal mobile telecommunications system (UMTS) network, the base station is referred to as an evolved NodeB (eNB or eNodeB for short) in an LTE network, and the base station may be referred to as a transmission/reception node (also referred to as a transmission reception point, TRP), a gNodeB (gNB), or the like in a 5G system.

Figure 2:
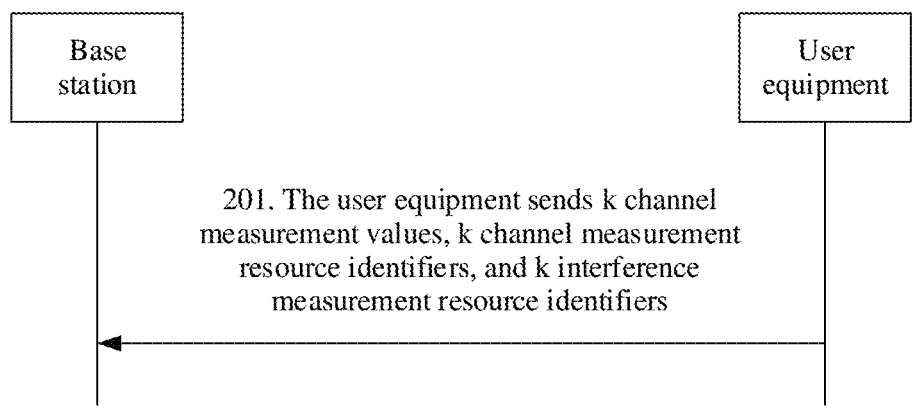
FIG. 2 is a flowchart of a communication method according to an embodiment of the present invention.

An embodiment of the present invention provides a communication method. The method may be applied to the system shown in FIG. 1. That a base station and user equipment implement the method is used as an example for description below. Although for ease of description, the embodiments of this application are described in a manner in which the base station and the user equipment interact with each other, execution and protection of the method may support a manner performed on a single side such as a base station side or a user equipment side. As shown in FIG. 2, the method includes the following steps.

Step 201: The base station receives k channel measurement values, k channel measurement resource identifiers, and k interference measurement resource identifiers that are sent by the user equipment, where k is an integer greater than or equal to 1.

Each channel measurement value corresponds to one channel measurement resource identifier and one interference measurement resource identifier, and the channel measurement value is calculated based on the channel measurement resource identifier and the interference measurement resource identifier that correspond to the channel measurement value.

In this embodiment of the present invention, a resource used for channel measurement may be referred to as a channel measurement resource, and a resource used for interference measurement may be referred to as an interference measurement resource. One channel measurement resource identifier may indicate at least one channel measurement resource, and one interference measurement resource identifier may indicate at least one interference measurement resource.

In this application, a resource identifier may be an ID (identity) of a resource, or may be an index of a resource, or other information that can uniquely indicate a resource. This is not limited in this embodiment of the present invention.

Optionally, the channel measurement value may include at least one piece of the following information: a channel quality indicator (CQI), a precoding matrix indicator (PMI), and a rank indicator (RI). The channel measurement resource identifier or the interference measurement resource identifier may be carried by using a CSI-RS resource indicator (CRI), and the CRI and the channel measurement value may be transmitted as one piece of CSI.

In this embodiment, the user equipment feeds back the channel measurement value and the corresponding channel measurement resource identifier and interference measurement resource identifier to the base station, and the base station may determine, based on the channel measurement resource identifier and the interference measurement resource identifier, resources based on which the channel measurement values are calculated.

Figure 3:
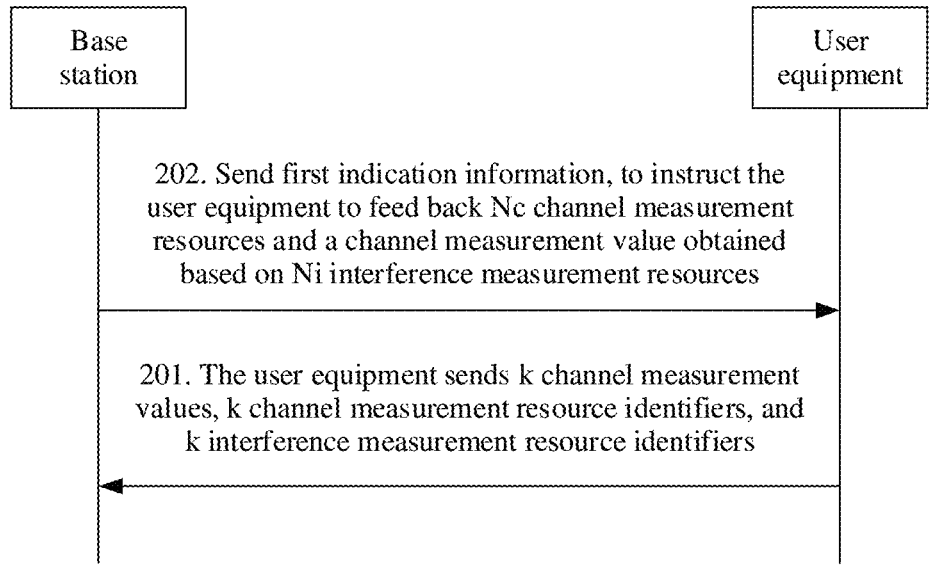
FIG. 3 is a flowchart of another communication method according to an embodiment of the present invention.

In an implementation, as shown in FIG. 3, before step 201, the method further includes:

Step 202: The base station sends first instruction information to the user equipment, where the first instruction information instructs the user equipment to feed back a channel measurement value obtained based on Nc channel measurement resources and Ni interference measurement resources, and Nc and Ni are integers greater than or equal to 1.

Optionally, k=min{Nc, Ni}.

In the foregoing implementation, the base station may configure Mc channel measurement resources and Mi interference measurement resources for the UE, and Mc and Mi are integers greater than or equal to 1. The base station may not limit a combination manner of the channel measurement resource and the interference measurement resource. When calculating the channel measurement value, the UE may dynamically combine the Mc channel measurement resources and the Mi interference measurement resources to obtain a plurality of channel measurement values. The UE performs selection on the obtained channel measurement values, and feeds back only one or more preferably selected channel measurement values and corresponding resource identifiers. The channel measurement value reported by the UE to the base station may be obtained through measurement performed based on all resources configured by the base station, or may be obtained through measurement performed based on some resources configured by the base station, Nc≤Mc, and Ni≤Mi.

When calculating the channel measurement value, the UE may use all configured channel measurement resources and interference measurement resources, or may use only some channel measurement resources and interference measurement resources. The UE may obtain one channel measurement value based on at least one channel measurement resource and at least one interference measurement resource.

Optionally, the first instruction information may carry Nc and Ni. Alternatively, the first instruction information may carry only one value N, and the UE determines a meaning of N according to a preset rule or based on configuration information of the base station. For example, N=Nc=Ni, N=Nc+Ni, or Nc=Ni=N/2.

The following further describes the foregoing implementation by using an example.

Figure 4:
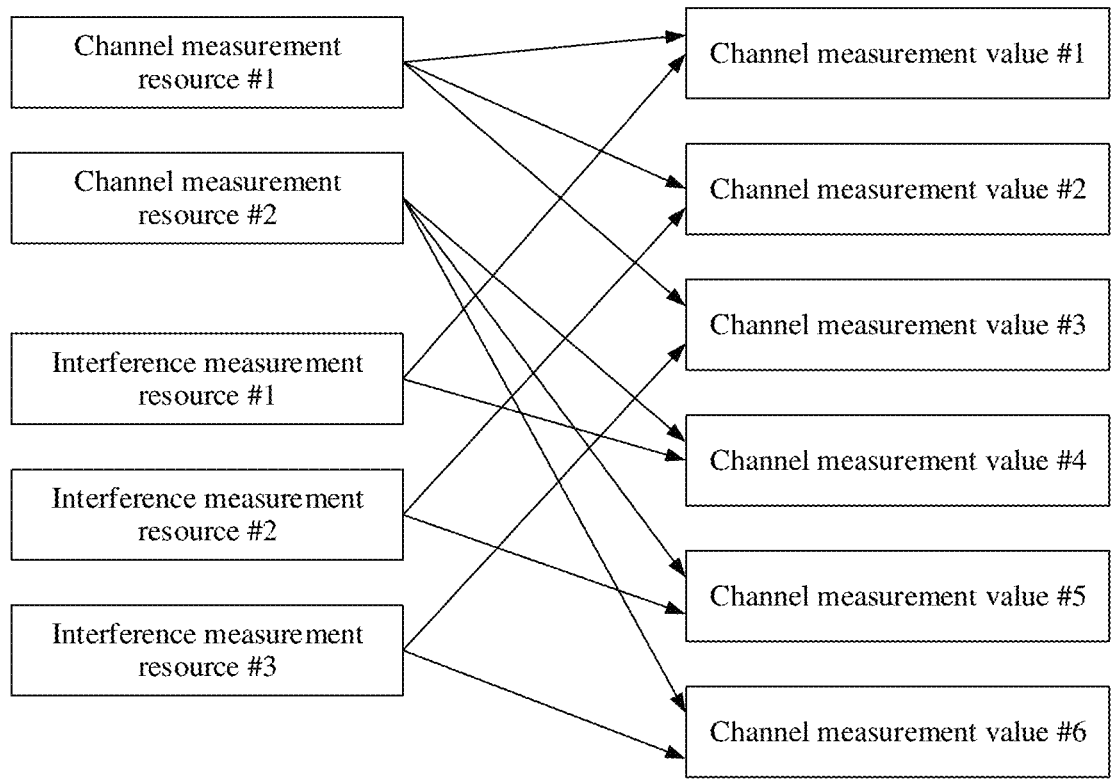
FIG. 4 is a schematic diagram of a correspondence between a resource and a channel measurement value according to an embodiment of the present invention.

As shown in FIG. 4, the base station configures two channel measurement resources (a channel measurement resource #1 and a channel measurement resource #2) and three interference measurement resources (an interference measurement resource #1, an interference measurement resource #2, and an interference measurement resource #3). The UE performs a pair combination and calculation on the channel measurement resources and the interference measurement resources to obtain six channel measurement values (a channel measurement value #1, a channel measurement value #2, a channel measurement value #3, a channel measurement value #4, a channel measurement value #5, and a channel measurement value #6). The UE performs preferable selection on the obtained channel measurement values to obtain two channel measurement values, for example, a channel measurement value #1 and a channel measurement value #6. The UE feeds back, to the base station, the channel measurement value #1, an identifier of the channel measurement resource #1 and an identifier of the interference measurement resource #1 that correspond to the channel measurement value #1, the channel measurement value #6, and an identifier of the channel measurement resource #2 and an identifier of the interference measurement resource #3 that correspond to the channel measurement value #6.

Optionally, the UE may select a channel measurement value according to the preset rule or a rule configured by the base station. For example, the UE selects only a channel measurement value that reaches a threshold, or selects one or more channel measurement values of best quality.

When the base station indicates Nc and Ni, k channel measurement values may be fed back, where k=min{Nc, Ni}, and k channel measurement values of best quality may be fed back.

In this embodiment of the present invention, a resource may be one or more resource blocks (RB), a resource set, a resource setting, a set of resource sets, a set of resource settings, or the like, and one resource setting may include at least one resource set. For example, the base station configures six channel measurement resources (which form a resource setting), and six interference measurement resources (which form a resource setting). The six channel measurement resources are grouped into three groups (each group may be referred to as a resource set), and each group includes two channel measurement resources. The six interference measurement resources are grouped into three groups (each group may be referred to as a resource set), and each group includes two channel measurement resources. For the channel measurement resource, a set of resource sets may include a plurality of resource sets. For example, a set of resource sets includes resource sets of two groups of channel measurement resources, and there are a total of four channel measurement resources. A set of resource settings may include a plurality of resource settings. For example, the set of resource settings includes two resource settings, including six channel measurement resources and six interference measurement resources.

The UE may feed back a resource identifier and a channel measurement value by using a physical uplink control channel (Physical uplink control channel, PUCCH) or a physical uplink shared channel (Physical uplink shared channel, PUSCH).

Figure 5:
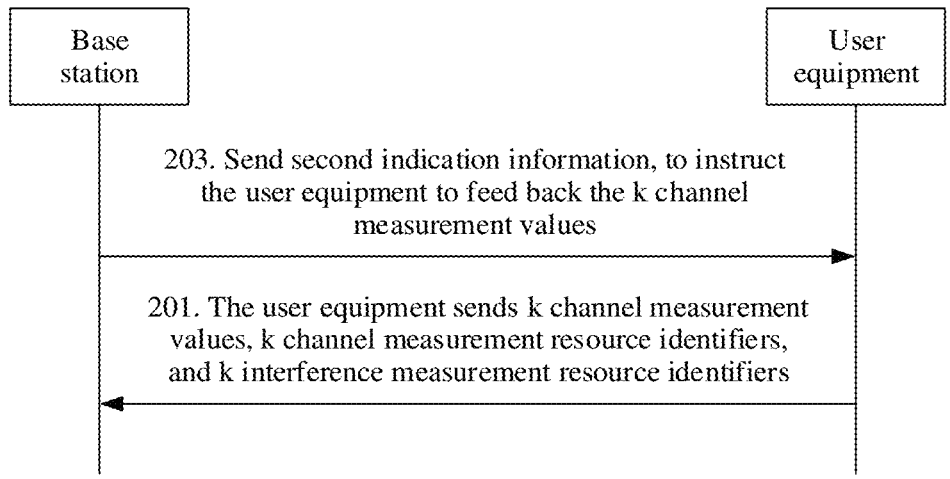
FIG. 5 is a flowchart of another communication method according to an embodiment of the present invention.

In another implementation, as shown in FIG. 5, before step 201, the method further includes the following.

Step 203: The network device sends second instruction information to the user equipment, where the second instruction information instructs the user equipment to feed back the k channel measurement values.

Optionally, each channel measurement value is obtained by the UE through measurement performed based on one channel measurement resource and one interference measurement resource.

Optionally, each channel measurement value is obtained by the UE through measurement performed based on m channel measurement resources and n interference measurement resources, and both m and n are integers greater than or equal to 1.

One channel measurement value is specifically obtained based on several channel measurement resources and interference measurement resources, and may be configured by the base station or predefined.

Further, optionally, when m and n are determined by the UE, the UE may feed back m and n to the base station.

As an alternative to the foregoing embodiment, when Nc and Ni have other values, the UE may feed back the resource identifier and the channel measurement value in a plurality of implementations. The implementations are described below by using examples. Specific implementation of the solution is not limited to the following examples.

Implementation 1:

When Nc=0 and Ni=0, the UE feeds back neither the channel measurement resource identifier nor the interference measurement resource identifier, but feeds back only one channel measurement value. The channel measurement value is obtained by the user equipment through measurement performed based on the Mc channel measurement resources and the Mi interference measurement resources.

Figure 6:
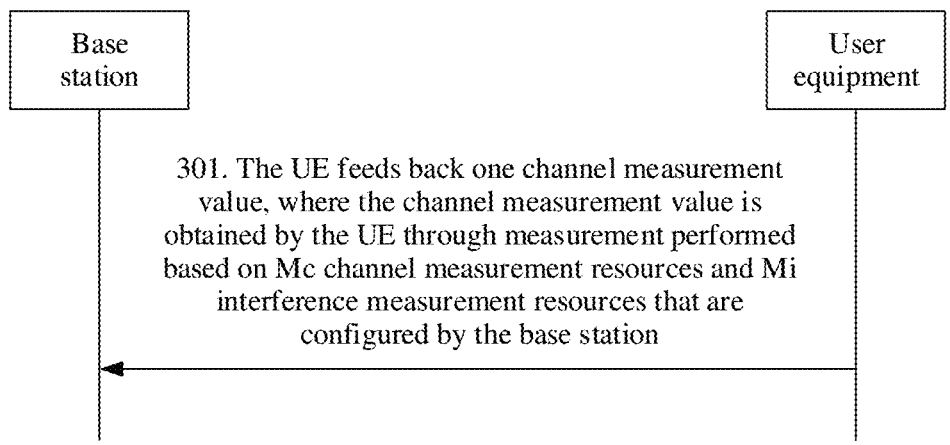
FIG. 6 is a flowchart of another communication method according to an embodiment of the present invention.

In this implementation, the base station may not need to notify the UE of Nc and Ni. As shown in FIG. 6, this implementation may include:

Step 301: The UE feeds back one channel measurement value to the base station, where the channel measurement value is obtained by the UE through measurement performed based on the Mc channel measurement resources and the Mi interference measurement resources that are configured by the base station.

When receiving the channel measurement value, the base station obtains the channel measurement value. Further, the base station can determine that the channel measurement value is obtained through measurement performed based on the Mc channel measurement resources and the Mi interference measurement resources that are configured by the base station.

Further, based on different values of Mc and Mi configured by the base station, the UE may obtain the channel measurement value in a plurality of cases:

(a) Mc=1, and Mi≥2. The UE obtains one channel measurement value based on the resources according to the preset rule or a rule configured by the base station.

Figure 7:
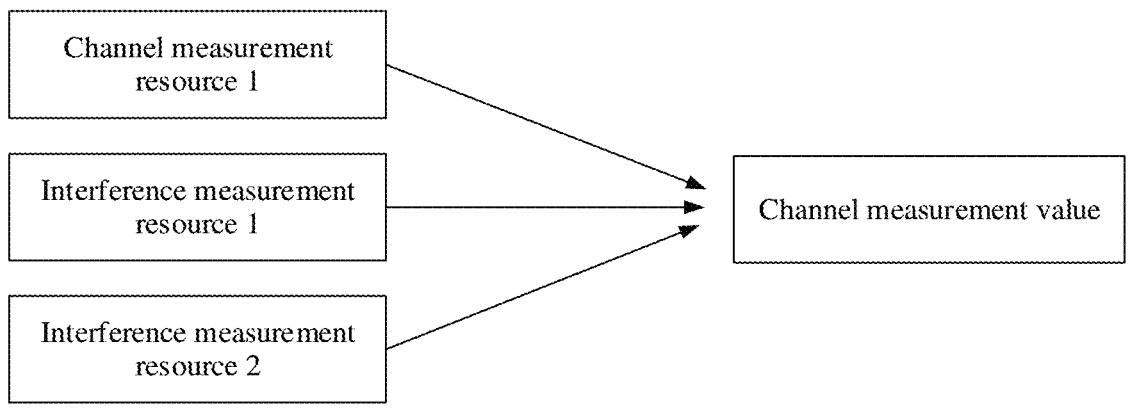
FIG. 7 is a schematic diagram of another correspondence between a resource and a channel measurement value according to an embodiment of the present invention.

For example, as shown in FIG. 7, the UE obtains Mi interference values based on the Mi interference measurement resources, the UE adds up the Mi interference values, or the UE averages the Mi interference values, and the UE further obtains the channel measurement value by using the processed interference values and a channel value obtained based on the channel measurement resources.

The base station may notify, by using signaling, the UE of processing to be performed on the Mi interference resources.

The base station may further notify a precoding status of the interference measurement resources by using signaling. If the base station notifies that the interference measurement resources are precoded, the UE first determines a precoding matrix of the interference measurement resources, and then processes a corresponding CSI-RS by using the precoding matrix, to obtain an interference value.

(b) Mc≥2, and Mi=1. The UE obtains one channel measurement value based on the resources according to the preset rule or a rule configured by the base station.

Figure 8:
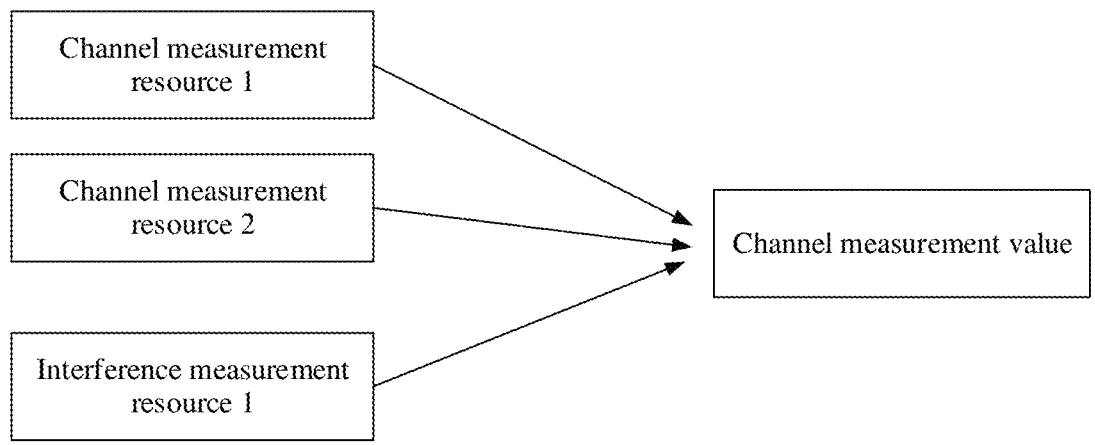
FIG. 8 is a schematic diagram of another correspondence between a resource and a channel measurement value according to an embodiment of the present invention.

For example, as shown in FIG. 8, the UE performs joint processing on channels obtained through measurement separately performed on a plurality of channel measurement resources, or the UE performs joint measurement on a plurality of channel measurement resources to obtain one channel measurement result.

(c) Mc≥2, and Mi≥2. The UE obtains one channel measurement value based on the resources according to the preset rule or a rule configured by the base station.

Figure 9:
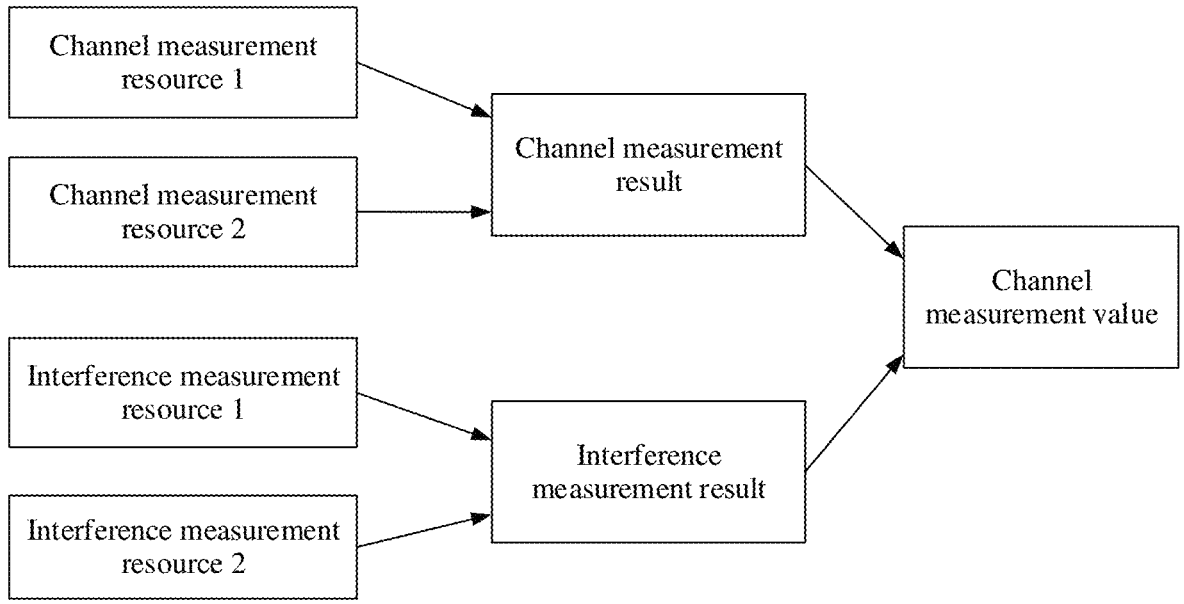
FIG. 9 is a schematic diagram of another correspondence between a resource and a channel measurement value according to an embodiment of the present invention.

For example, as shown in FIG. 9, the UE obtains a channel measurement result on a plurality of channel measurement resources, and obtains an interference measurement result on a plurality of interference measurement resources. For details, refer to the processing manners in the foregoing scenarios (a) and (b).

Implementation 2:

When Nc=0 and Ni≥1, the UE does not feed back the channel measurement resource identifier, but feeds back Ni interference measurement resource identifiers and a corresponding channel measurement value. The channel measurement value is obtained by the UE through measurement performed based on the Ni interference measurement resources.

Figure 10:
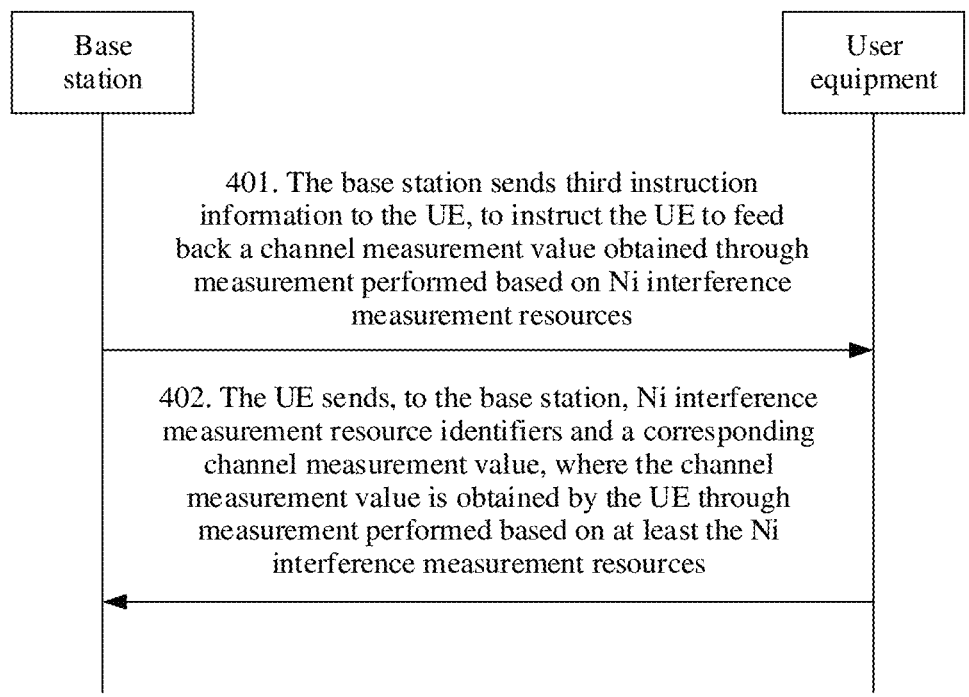
FIG. 10 is a flowchart of another communication method according to an embodiment of the present invention.

In this implementation, the base station may not need to notify the UE of Nc. As shown in FIG. 10, this implementation includes:

Step 401: The base station sends third instruction information to the UE, to instruct the UE to feed back the channel measurement value obtained through measurement performed based on the Ni interference measurement resources. This step is optional.

Step 402: The UE sends, to the base station, the Ni interference measurement resource identifiers and the channel measurement value corresponding to the Ni interference measurement resource identifiers, where the channel measurement value is obtained by the UE through measurement performed based on at least the Ni interference measurement resources. Optionally, the channel measurement value is obtained by the UE based on the Ni interference measurement resources and one or more channel measurement resources. The one or more channel measurement resources may be agreed on by the UE and the base station.

Correspondingly, the base station receives the Ni interference measurement resource identifiers and the channel measurement value corresponding to the Ni interference measurement resource identifiers, to obtain the Ni interference measurement resource identifiers and the channel measurement value corresponding to the Ni interference measurement resource identifiers.

Figure 11:
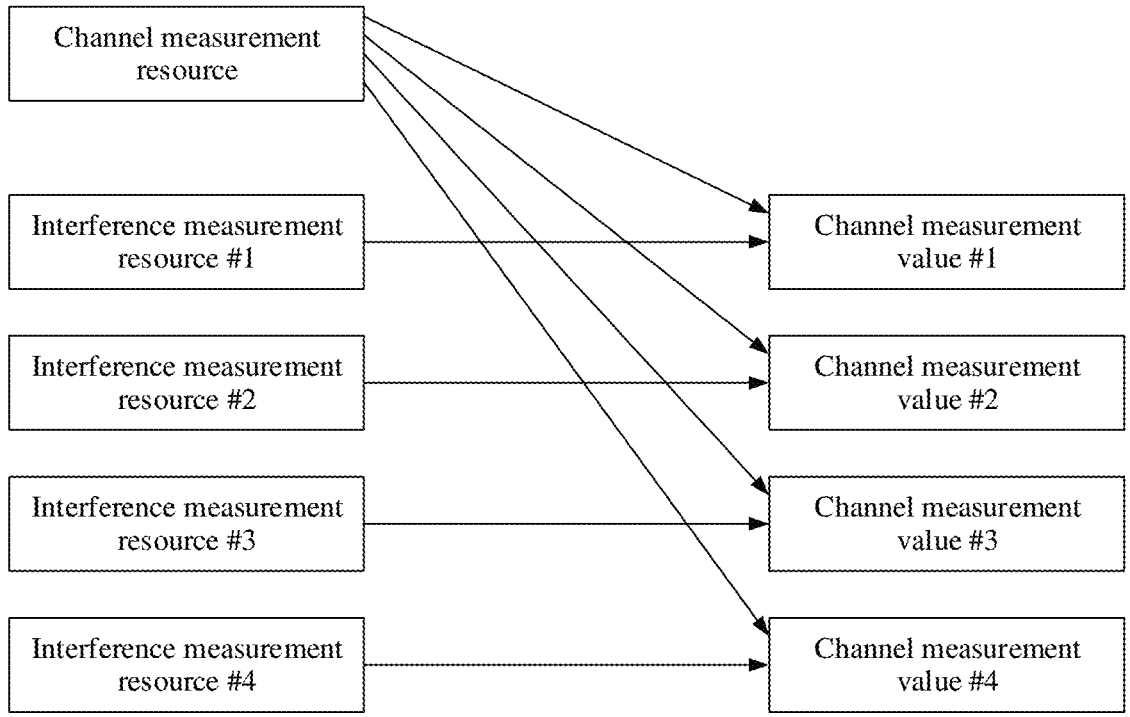
FIG. 11 is a schematic diagram of another correspondence between a resource and a channel measurement value according to an embodiment of the present invention.

For example, as shown in FIG. 11, the base station configures one channel measurement resource, the base station configures four interference measurement resources #1, #2, #3, and #4, the base station configures Ni=2, and the UE preferably selects two channel measurement values from four channel measurement values (for example, CQIs). Corresponding to the interference measurement resources #2 and #3, the UE feeds back interference measurement resource identifiers #2 and #3, and corresponding CQIs.

When the UE feeds back a resource identifier by using signaling, a quantity of bits occupied by each resource identifier in the signaling may be determined based on a quantity of resources configured by the base station. For example, the base station configures Mc channel measurement resources, and a quantity of bits occupied by each channel measurement resource identifier is obtained by rounding up log 2(Mc).

Channel coding may be performed on resource identifiers sequentially, for example, may be performed in ascending or descending order of the resource identifiers. A channel coding order of channel measurement values corresponds to a channel coding order of the resource identifiers.

A channel coding relationship between a resource identifier and a channel measurement value may be one of the following: (1) The resource identifier and the channel measurement value are coded together. For example, the resource identifier and the channel measurement value are concatenated in a manner of the resource identifier being located before the channel measurement value, and then are sent to a channel encoder. (2) The resource identifier and the channel measurement value are separately coded. For example, the channel measurement value is an RI, for a channel measurement value corresponding to the interference measurement resource identifier #2, RI=2, and for a channel measurement value corresponding to the interference measurement resource identifier #3, RI=4. The UE separately codes an interference measurement resource identifier and an RI value. To be specific, the UE sequentially concatenates a plurality of interference measurement resource identifiers and then sends the concatenated interference measurement resource identifiers to a channel encoder, to obtain interference measurement identifiers after channel coding, and the UE sequentially concatenates a plurality of RI values and then sends the concatenated RI values to the channel encoder, to obtain RI values after channel coding. For example, the UE performs channel coding on the interference measurement resource identifiers #2 and #3 (for example, 0110), and the UE performs channel coding on the RI values 2 and 4 (for example, 0111) of the RI. A correspondence between a bit and a CRI value or an RI value is determined according to a protocol. For example, it may be determined, through a table search, that bit information corresponding to the RI value 2 is 01, and bit information corresponding to the resource identifier #2 is 01.

When channel measurement values fed back by the UE are more than one CQI, a differential feedback manner may be used. One CQI is used as a reference, and only a difference is fed back for another CQI, to reduce a feedback amount. For example, a CQI ranked first is used as a reference, and only a difference between the reference CQI and another CQI is fed back for the another CQI.

Implementation 3:

When Nc≥1 and Ni=0, the UE does not feed back the interference measurement resource identifier, but feeds back Nc channel measurement resource identifiers and a corresponding channel measurement value. The channel measurement value is obtained by the UE through measurement performed based on the Nc channel measurement resources.

Figure 12:
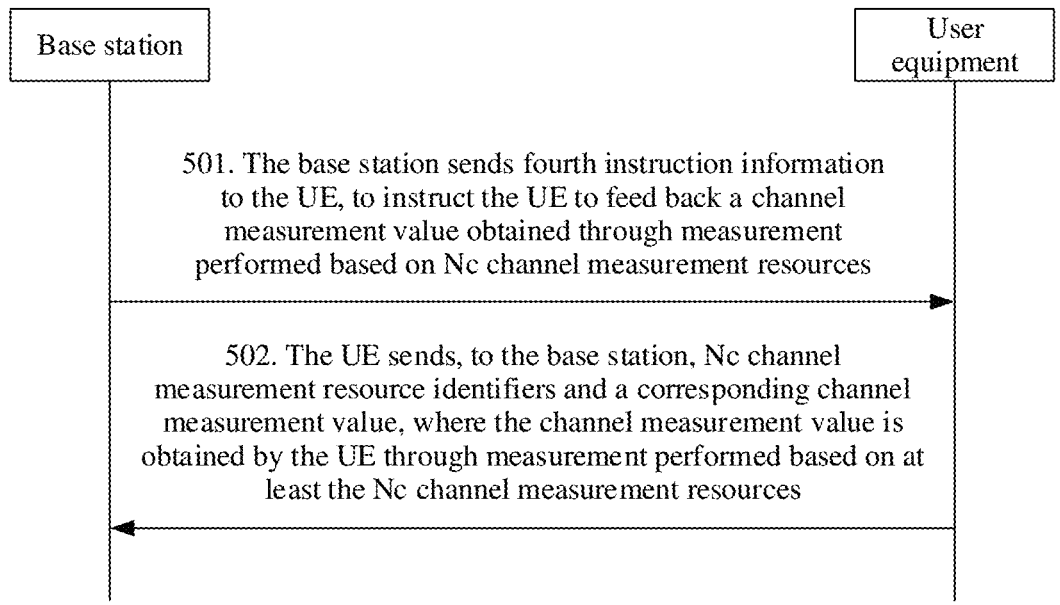
FIG. 12 is a flowchart of another communication method according to an embodiment of the present invention.

In this implementation, the base station may not need to notify the UE of Ni. As shown in FIG. 12, this implementation includes:

Step 501: The base station sends fourth instruction information to the UE, to instruct the UE to feed back the channel measurement value obtained based on the Nc channel measurement resources. This step is optional.

Step 502: The UE sends, to the base station, the Nc channel measurement resource identifiers and the channel measurement value corresponding to the Nc channel measurement resource identifiers, where the channel measurement value is obtained by the UE through measurement performed based on at least the Nc channel measurement resources. Optionally, the channel measurement value is obtained by the UE based on the Nc channel measurement resources and one or more interference measurement resources. The one or more interference measurement resources may be agreed on by the UE and the base station.

Correspondingly, the base station receives the Nc channel measurement resource identifiers and the channel measurement value corresponding to the Nc channel measurement resource identifiers, to obtain the Nc channel measurement resource identifiers and the channel measurement value corresponding to the Nc channel measurement resource identifiers.

For example, the base station configures channel measurement resources #1, #2, and #3, the base station configures Nc=1, and the UE preferably selects one channel measurement value from the three channel measurement values (for example, CQIs). In correspondence to the channel measurement resource #3, the UE feeds back the measurement resource identifier #3 and a corresponding CQI.

When the UE feeds back a resource identifier by using signaling, a quantity of bits occupied by each resource identifier in the signaling may be determined based on a quantity of resources configured by the base station. For example, the base station configures Mi interference measurement resources, and a quantity of bits occupied by each interference measurement resource identifier is obtained by rounding up log 2(Mi).

For channel coding performed on a resource identifier, a channel coding relationship between a resource identifier and a channel measurement value, and a differential feedback of a CQI, refer to the descriptions in Implementation 2. Details are not described herein again.

Implementation 4:

When Nc≥1, and Ni≥1, a quantity of channel measurement values fed back by the UE may be determined based on Nc or Ni. For example, for a quantity k of fed-back channel measurement values, k=min{Nc, Ni}, or k=Nc*Ni. Alternatively, the UE determines the quantity of fed-back channel measurement values based on another parameter or factor.

Figure 13:
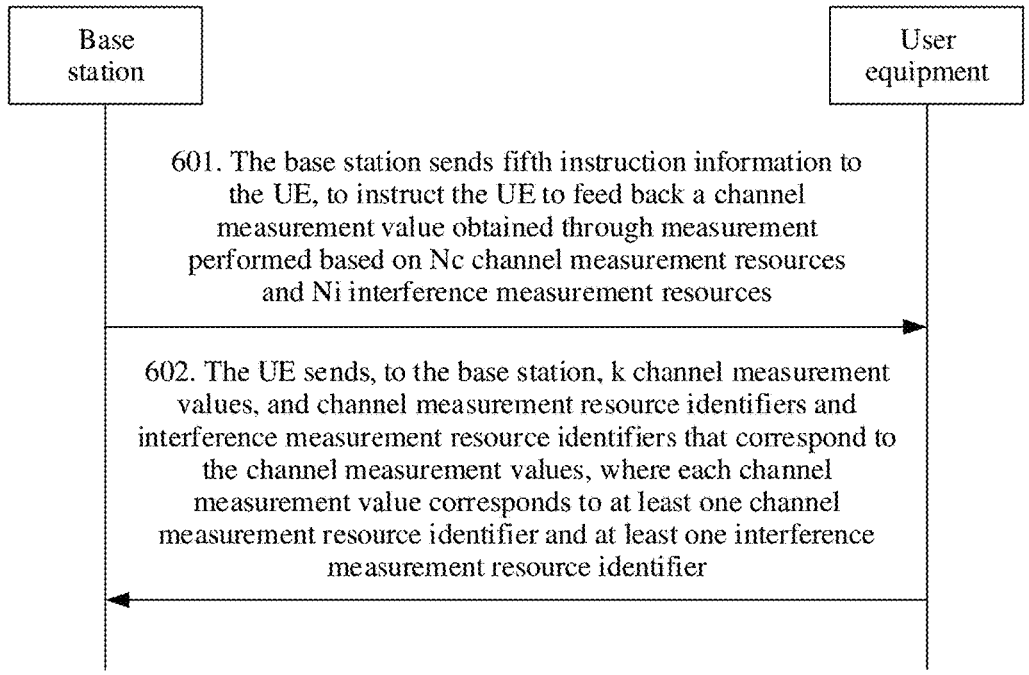
FIG. 13 is a flowchart of another communication method according to an embodiment of the present invention.

In this implementation, the base station needs to notify the UE of Nc and Ni. As shown in FIG. 13, this implementation includes:

Step 601: The base station sends fifth instruction information to the UE, where the fifth instruction information instructs the UE to feed back the channel measurement value obtained based on the Nc channel measurement resources and the Ni interference measurement resources. This step is optional.

Step 602: The UE sends, to the base station, the k channel measurement values, and channel measurement resource identifiers and interference measurement resource identifiers that correspond to the channel measurement values, where each channel measurement value corresponds to at least one channel measurement resource identifier and at least one interference measurement resource identifier, and the channel measurement value is calculated based on the channel measurement resource identifiers and the interference measurement resource identifiers that correspond to the channel measurement value.

The k is an integer greater than or equal to 1.

Correspondingly, the base station receives the k channel measurement values and the channel measurement resource identifiers and the interference measurement resource identifiers that correspond to the channel measurement values, to obtain the k channel measurement values corresponding to the channel measurement resource identifiers and the interference measurement resource identifiers.

For example, when Nc=Ni=1, the UE feeds back one channel measurement resource identifier and one interference measurement resource identifier, and one channel measurement value obtained based on the one channel measurement resource identifier and the one interference measurement resource identifier.

In this embodiment of the present invention, k may be configured by the base station, or may be calculated based on Nc or Ni according to a preset rule or a rule configured by the base station, or may be determined only by the UE. When k is determined by the UE, after determining k, the UE may feed back k to the base station. Channel coding may be separately performed on k and the channel measurement value, and a resource mapping location of k may be a resource location with stronger robustness, for example, a location closer to an uplink pilot.

There may be a plurality of specific manners in which UE feeds back a channel measurement value and a resource identifier. The following provides an example for description.

(a) The UE separately feeds back a plurality of channel measurement values and a combination of a channel measurement resource identifier and an interference measurement resource identifier. A correspondence between a channel measurement value and a combination of a channel measurement resource identifier and an interference measurement resource identifier is predefined or is configured by the base station.

Figure 14:
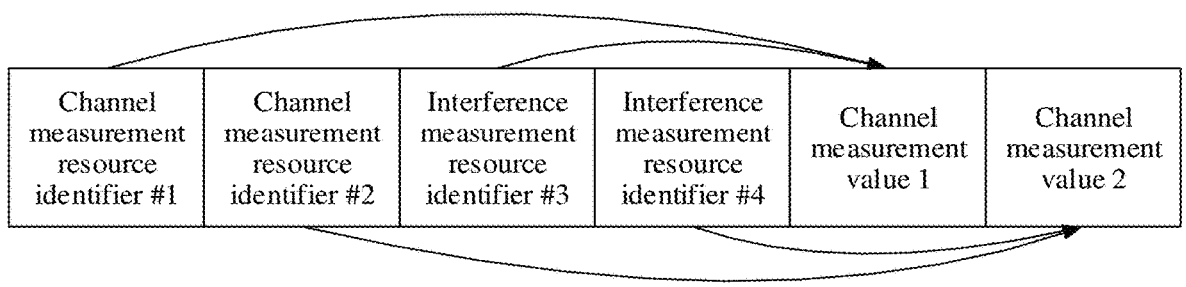
FIG. 14 is a schematic diagram of a correspondence between a resource identifier and a channel measurement value according to an embodiment of the present invention.

For example, as shown in FIG. 14, Nc=Ni=2, and the UE feeds back channel measurement resource identifiers #1 and #2, interference measurement resource identifiers #3 and #4, and two channel measurement values. In this case, the first channel measurement value is obtained based on the channel measurement resource #1 and the interference measurement resource #3, and the second channel measurement value is obtained based on the channel measurement resource #2 and the interference measurement resource #4.

When the UE feeds back a resource identifier, the quantity of bits occupied by each resource identifier may be determined in the following manner: (1) The quantity of bits of each channel measurement resource identifier is determined based on a quantity of channel measurement resources configured by the base station. For example, the base station configures Mc channel measurement resources, and a quantity of bits occupied by each channel measurement resource identifier is obtained by rounding up log 2(Mc). A quantity of bits of each interference measurement resource identifier is determined based on a quantity of interference measurement resources configured by the base station. For example, the base station configures Mi channel measurement resources, and a quantity of bits occupied by each channel measurement resource identifier is obtained by rounding up log 2(Mi). (2) The quantity of bits of each resource identifier is determined based on a total quantity of channel measurement resources and interference measurement resources. For example, a total quantity of channel measurement resources and interference measurement resources configured by the base station is M, and a quantity of bits of an identifier of each channel measurement resource or interference measurement resource is obtained by rounding up log 2(M).

Optionally, the UE sorts resource identifiers, and a channel encoder of the UE performs channel coding on the sorted resource identifiers. Channel coding may be performed on channel resource identifiers sequentially, and may be performed in ascending or descending order of the channel resource identifiers. Interference measurement resource identifiers are sorted based on a correspondence between an interference measurement resource and a channel measurement resource. A channel measurement resource and an interference measurement resource that have a correspondence are used to obtain a channel measurement value through measurement. The channel measurement resource identifier and the interference measurement resource identifier may be concatenated. For example, the channel measurement resource identifiers #1 and #2 and the interference measurement resource identifiers #3 and #4 are concatenated to obtain #1#2#3#4. For example, the channel measurement resource identifiers #1 and #2 and the interference measurement resource identifiers #3 and #4 are cross-concatenated to obtain #1#3#2#4.

A resource identifier fed back by the UE may further carry attribute information, to indicate whether a resource corresponding to the resource identifier is used for channel measurement or interference measurement. For example, the attribute information may be determined based on a feedback format of the resource identifier.

When channel coding is performed on a resource identifier and a channel measurement value, channel coding may be performed on a channel measurement resource identifier, an interference measurement resource identifier, and a channel measurement value separately, or channel coding may be performed on at least two of a channel measurement resource identifier, an interference measurement resource identifier, and a channel measurement value in a concatenated manner. A channel coding sequence may be flexibly adjusted based on an actual requirement. One channel coding sequence may be determined according to a protocol or different channel coding sequences may be determined based on difference cases. Alternatively, the channel coding sequence may be configured by the base station by using signaling.

(b) The UE feeds back a plurality of channel measurement values and a plurality of resource identifier groups {a channel measurement resource identifier and an interference measurement resource identifier}. A correspondence between a resource identifier group and a channel measurement value is predefined or is configured by the base station.

Figure 15:
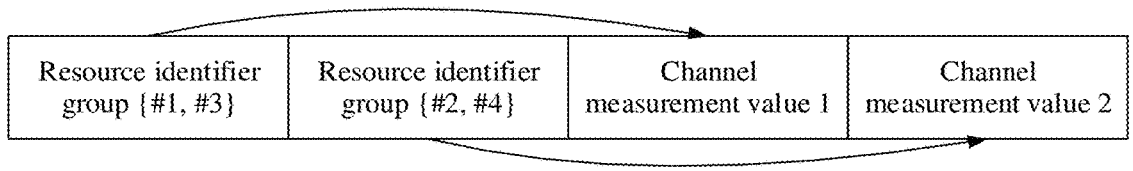
FIG. 15 is a schematic diagram of another correspondence between a resource identifier and a channel measurement value according to an embodiment of the present invention.

For example, as shown in FIG. 15, Nc=Ni=2, and the UE feeds back two resource identifier groups {#1, #3} and {#2, #4}, and two channel measurement values. In this case, the first channel measurement value is obtained based on a channel measurement resource #1 and an interference measurement resource #3, and the second channel measurement value is obtained based on a channel measurement resource #2 and an interference measurement resource #4.

When the UE feeds back resource identifier groups by using signaling, the UE may feed back the resource identifier groups in ascending or descending order of channel measurement resources, or in ascending or descending order of interference measurement resources. For example, a sequence of concatenating the two groups of resource identifiers in signaling may be #1#3#2#4.

When channel coding is performed on the resource identifier and the channel measurement value (for example, an RI), joint channel coding may be performed on a channel measurement resource identifier and an interference measurement resource identifier, and separate channel coding is performed on the channel measurement value; or joint channel coding is performed on a channel measurement resource identifier, an interference measurement resource identifier, and the channel measurement value.

(c) The UE feeds back a plurality of channel measurement values and indexes (index) of a plurality of resource identifier groups {a channel measurement resource identifier, an interference measurement resource identifier}. An index of a resource identifier group {a channel measurement resource identifier, an interference measurement resource identifier} and a correspondence between the index and a channel measurement value is predefined or is configured by the base station.

Figure 16:
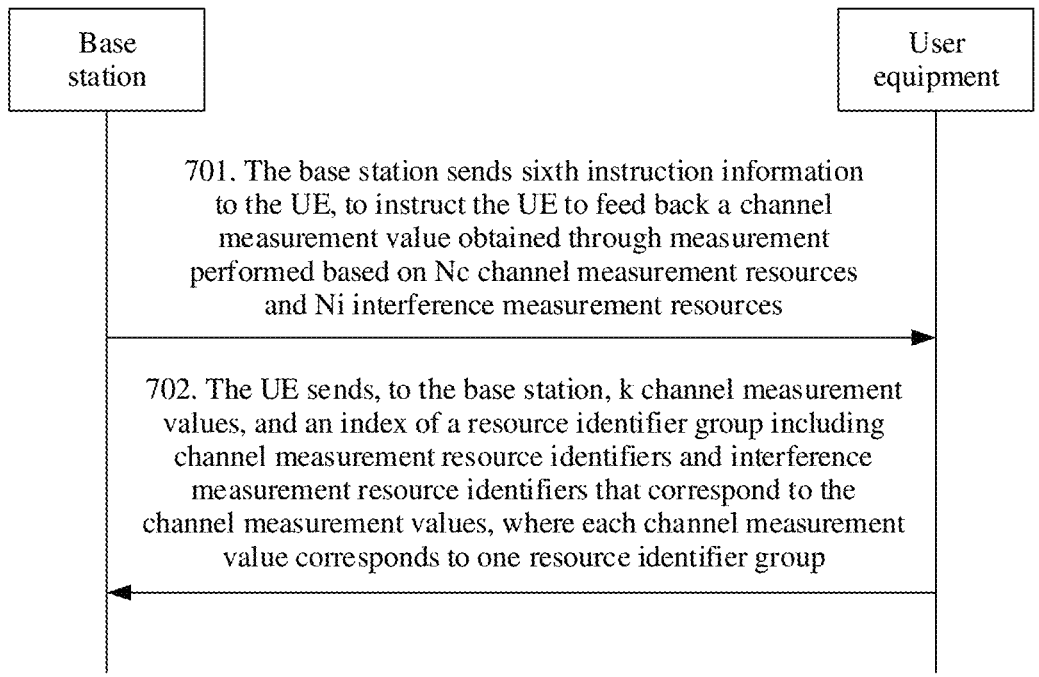
FIG. 16 is a flowchart of another communication method according to an embodiment of the present invention.

In this implementation, the UE does not directly feed back the channel measurement resource identifier and the interference measurement resource identifier, but feeds back the index of the resource identifier group. As shown in FIG. 16, this implementation includes:

Step 701: The base station sends sixth instruction information to the UE, where the sixth instruction information instructs the UE to feed back the channel measurement value obtained based on the Nc channel measurement resources and the Ni interference measurement resources. This step is optional.

Step 702: The UE sends, to the base station, the k channel measurement values, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value.

Correspondingly, a base station receives the k channel measurement values and the index of the resource identifier group including the channel measurement resource identifiers and the interference measurement resource identifiers that correspond to the channel measurement values, to obtain the channel measurement values corresponding to the channel measurement resource identifiers and the interference measurement resource identifiers in the resource identifier group corresponding to the index.

For example, if the base station configures channel measurement resources #1, #2, and #3 and interference measurement resources #4 and #5, combinations of the channel measurement resources and the interference measurement resources may be {(#1, #4), (#2, #4), (#3, #4), (#1, #5), (#2, #5), and (#3, #5)}, and each combination corresponds to one piece of index information. For example, 3-bit indexes are 000, 001, 010, 011, 100, and 101. A correspondence between a resource identifier group and an index may be predefined. A quantity of bits of each index may be determined based on a quantity of combinations of the channel measurement resources and the interference measurement resources. For example, there are a total of six resource combinations: {(#1, #4), (#2, #4), (#3, #4), (#1, #5), (#2, #5), and (#3, #5)}. Therefore, a quantity of bits of each index is 3.

Figure 17:
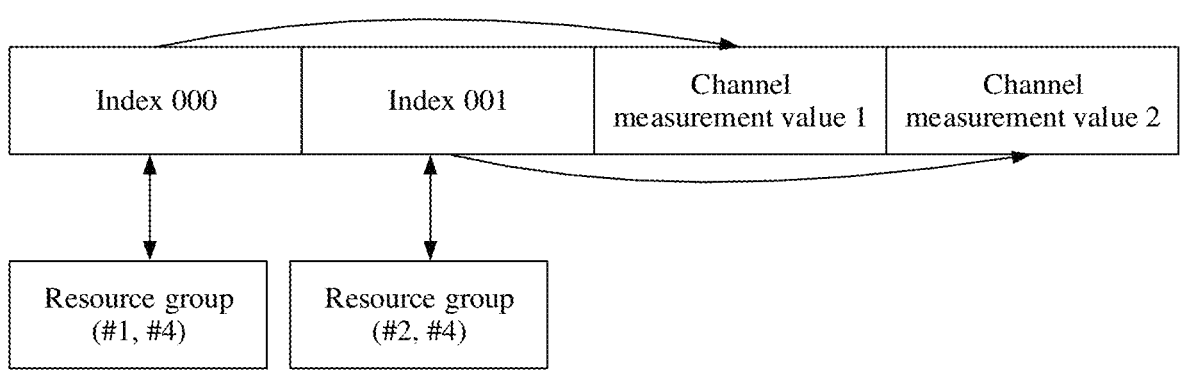
FIG. 17 is a schematic diagram of another correspondence between a resource identifier and a channel measurement value according to an embodiment of the present invention.

As shown in FIG. 17, Nc=Ni=2, and the UE feeds back two indexes 000 and 001, and two channel measurement values. In this case, the first channel measurement value is obtained based on the channel measurement resource #1 and the interference measurement resource #4, and the second channel measurement value is obtained based on the channel measurement resource #2 and the interference measurement resource #4.

Channel coding may be sequentially performed on indexes, for example, in ascending order or descending order of the indexes, or in ascending order or descending order of channel measurement resource identifiers in resource identifier groups corresponding to the indexes.

A relationship between channel coding performed on an index of a resource identifier group and channel coding performed on a channel measurement value may be as follows: (1) Joint channel coding is performed on the index of the resource identifier group and the channel measurement value. (2) Channel coding is performed on the index of the resource identifier group, and separate channel coding is performed on the channel measurement value.

(d) The base station configures or predefines a correspondence between a channel measurement resource identifier and an interference measurement resource identifier, the UE feeds back only the channel measurement resource identifier, and the interference measurement resource identifier is obtained based on the channel measurement resource identifier.

For example, if a channel measurement resource identifier fed back by the UE is #0, an interference measurement resource identifier is also #0.

In the foregoing implementation, when there are a plurality of optional channel coding schemes for information that needs to be fed back by the UE, a specifically used channel coding scheme may be configured by the base station or predefined.

In this embodiment of the present invention, for a scenario in which the UE feeds back more than one CQI, refer to the differential feedback manner in Implementation 2.

In this embodiment of the present invention, in a scenario in which more than one resource identifier needs to be fed back, for a quantity of bits occupied by the resource identifier, refer to the method in (a), (b), and (c) in Implementation 4, or use another similar method.

It should be noted that, when a quantity k of channel measurement values fed back by the UE is configured by the base station, a manner of feeding back a channel measurement value, a channel measurement resource identifier, and an interference measurement resource identifier may also be the method in (a), (b), (c), and (d) in Implementation 4.

Figure 18:
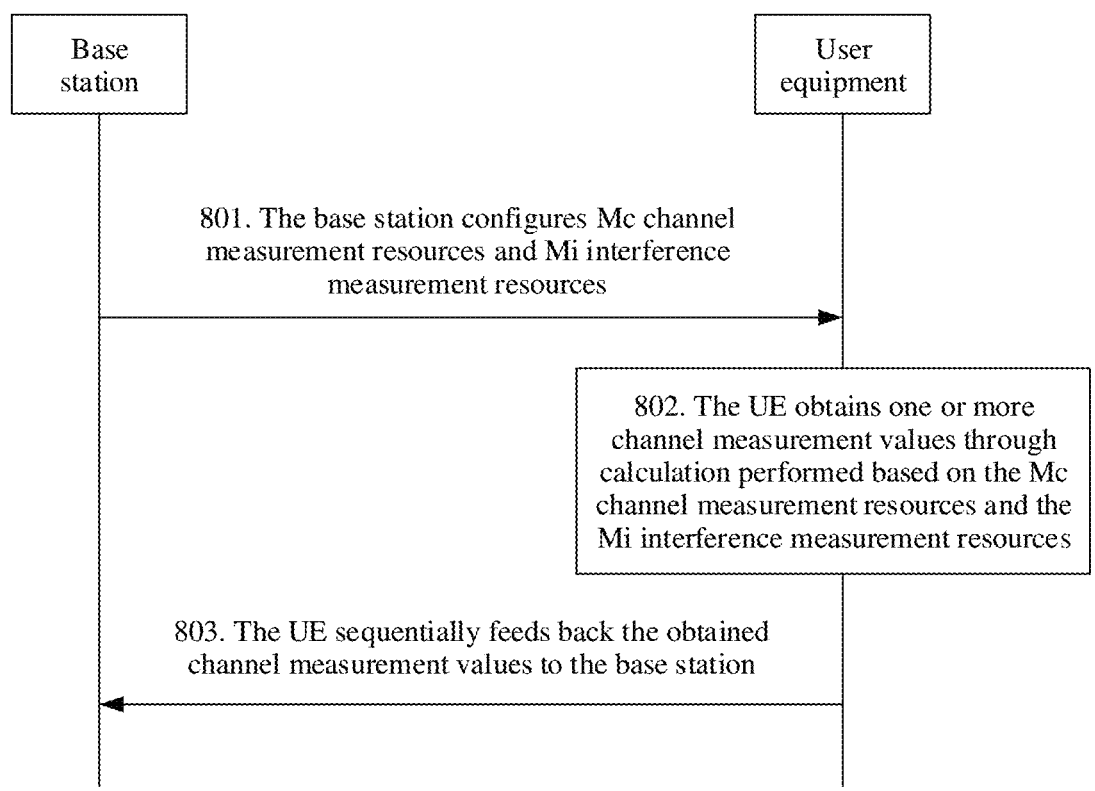
FIG. 18 is a flowchart of another communication method according to an embodiment of the present invention.

This application further provides a communication method. As shown in FIG. 18, the method includes the following steps.

801. A base station configures Mc channel measurement resources and Mi interference measurement resources.

Herein, Mc and Mi are integers greater than or equal to 1.

802. UE calculates one or more channel measurement values based on the Mc channel measurement resources and the Mi interference measurement resources.

For example, when Mc=Mi=2, the UE may obtain four channel measurement values through measurement.

803. The UE sequentially feeds back the obtained channel measurement values to the base station.

A sequence of the channel measurement values may be predefined or may be configured by the base station.

Optionally, the channel measurement values are sorted based on identifiers of used channel measurement resources.

Alternatively, the channel measurement values are sorted based on identifiers of used interference measurement resources.

Alternatively, the channel measurement values are sorted based on identifiers of used channel measurement resources and identifiers of used interference measurement resources.

For example, sorting is performed based on a value obtained based on an operation: an identifier of a channel measurement resource*an identifier of an interference measurement resource. In this embodiment, * represents multiplication.

Optionally, sorting may be performed by combining two or more of the foregoing rules.

It should be noted that, in this embodiment, the UE measures all channel measurement resources and interference measurement resources configured by the base station. In actual implementation, the UE may measure only some channel measurement resources and interference measurement resources.

In this embodiment, the UE feeds back the channel measurement values in a preset sequence or in a sequence configured by the base station, so that the base station can determine resources corresponding to the received channel measurement value.

This embodiment of the present invention further provides an apparatus embodiment for implementing steps and methods in the foregoing method embodiments. The methods, steps, technical details, technical effects, and the like in the foregoing method embodiments are also applicable to the apparatus embodiment, and details are not described below again.

Figure 19:
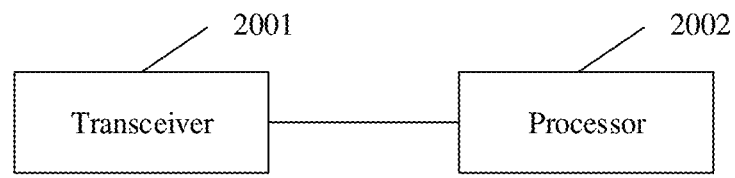
FIG. 19 is a schematic structural diagram of a network device according to an embodiment of the present invention.

An embodiment of the present invention provides a network device. As shown in FIG. 19, the network device includes: a transceiver 2001 and a processor 2002.

Corresponding to the solutions related to FIG. 2, FIG. 3, and FIG. 5 in the method embodiments.

The transceiver is configured to receive k channel measurement values, k channel measurement resource identifiers, and k interference measurement resource identifiers that are sent by user equipment, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

The processor is configured to obtain the k channel measurement values, the k channel measurement resource identifiers, and the k interference measurement resource identifiers.

Optionally, the channel measurement value includes at least one of the following: a channel quality indicator CQI, a precoding matrix indicator PMI, and a rank indicator RI.

In an implementation, the transceiver is further configured to: before receiving the k channel measurement values, send first instruction information to the user equipment, where the first instruction information instructs the user equipment to feed back a channel measurement value obtained based on Nc channel measurement resources and Ni interference measurement resources, Nc and Ni are integers greater than or equal to 1, and k=min{Nc, Ni}.

In another implementation, the transceiver is further configured to: before receiving the k channel measurement values, send second instruction information to the user equipment, where the second instruction information instructs the user equipment to feed back the k channel measurement values.

Corresponding to the solutions related to FIG. 10 in the method embodiments:

The transceiver is configured to receive Ni interference measurement resource identifiers sent by user equipment and a channel measurement value corresponding to the Ni interference measurement resource identifiers, where the channel measurement value is obtained by the user equipment through measurement performed based on at least the Ni interference measurement resources, and Ni is an integer greater than or equal to 1.

The processor is configured to obtain the Ni interference measurement resource identifiers and the channel measurement value corresponding to the Ni interference measurement resource identifiers.

Optionally, the channel measurement value includes at least one of the following: a channel quality indicator CQI, a precoding matrix indicator PMI, and a rank indicator RI.

Optionally, the transceiver is further configured to: before receiving the channel measurement value, send third instruction information to the user equipment, to instruct the user equipment to feed back the channel measurement value obtained through measurement performed based on the Ni interference measurement resources.

Corresponding to the solutions related to FIG. 12 in the method embodiments:

The transceiver is configured to receive Nc channel measurement resource identifiers sent by user equipment and a channel measurement value corresponding to the Nc channel measurement resource identifiers, where the channel measurement value is obtained by the user equipment through measurement performed based on at least the Nc channel measurement resources, and Nc is an integer greater than or equal to 1.

The processor is configured to obtain the Nc channel measurement resource identifiers and the channel measurement value corresponding to the Nc channel measurement resource identifiers.

Optionally, the channel measurement value includes at least one of the following: a channel quality indicator CQI, a precoding matrix indicator PMI, and a rank indicator RI.

Optionally, the transceiver is further configured to: before receiving the channel measurement value, send fourth instruction information to the user equipment, to instruct the user equipment to feed back the channel measurement value obtained based on the Nc channel measurement resources.

Corresponding to the solutions related to FIG. 13 in the method embodiments:

The transceiver is configured to receive k channel measurement values sent by user equipment, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

The processor is configured to obtain the k channel measurement values, and the channel measurement resource identifiers and the interference measurement resource identifiers that correspond to the channel measurement values.

Optionally, the channel measurement value includes at least one of the following: a channel quality indicator CQI, a precoding matrix indicator PMI, and a rank indicator RI.

In an implementation, the transceiver is further configured to: before receiving the k channel measurement values, send fifth instruction information to the user equipment, where the fifth instruction information instructs the user equipment to feed back a channel measurement value obtained based on Nc channel measurement resources and Ni interference measurement resources, and k is calculated based on Nc and Ni.

In another implementation, the transceiver is further configured to: before receiving the k channel measurement values, send seventh instruction information to the user equipment, where the seventh instruction information instructs the user equipment to feed back the k channel measurement values.

Optionally, the transceiver is further configured to receive m and n that are sent by the user equipment.

Corresponding to the solutions related to FIG. 16 in the method embodiments:

The transceiver is configured to receive k channel measurement values sent by user equipment, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

The processor is configured to obtain the k channel measurement values, and the channel measurement resource identifiers and the interference measurement resource identifiers that correspond to the k channel measurement values.

Optionally, the channel measurement value includes at least one of the following: a channel quality indicator CQI, a precoding matrix indicator PMI, and a rank indicator RI.

Optionally, the transceiver is further configured to: before receiving the k channel measurement values, send sixth instruction information to the user equipment, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

Figure 20:
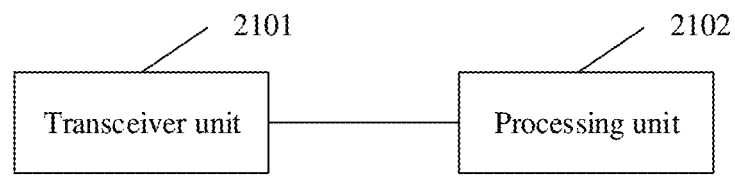
FIG. 20 is a schematic structural diagram of another network device according to an embodiment of the present invention.

An embodiment of the present invention provides a network device. As shown in FIG. 20, the network device includes a transceiver unit 2101 and a processing unit 2102. The transceiver unit in this embodiment may perform a function similar to that of the transceiver in the foregoing embodiment, and the processing unit may perform a function similar to that of the processor.

Figure 21:
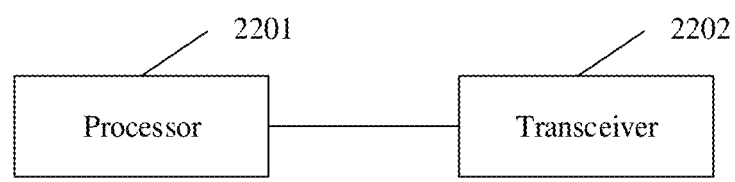
FIG. 21 is a schematic structural diagram of user equipment according to an embodiment of the present invention.

An embodiment of the present invention provides user equipment. As shown in FIG. 21, the user equipment includes a processor 2201 and a transceiver 2202.

Corresponding to the solutions related to FIG. 2, FIG. 3, and FIG. 5 in the method embodiments:

The processor is configured to calculate k channel measurement values.

The transceiver is configured to send the k channel measurement values, k channel measurement resource identifiers, and k interference measurement resource identifiers to a network device, where k is an integer greater than or equal to 1, each channel measurement value corresponds to one channel measurement resource identifier and one interference measurement resource identifier, and the channel measurement value is calculated based on the channel measurement resource identifier and the interference measurement resource identifier that correspond to the channel measurement value.

Optionally, the channel measurement value includes at least one of the following: a channel quality indicator CQI, a precoding matrix indicator PMI, and a rank indicator RI.

In an implementation, the transceiver is further configured to: before sending the k channel measurement values, receive first instruction information sent by the network device, where the first instruction information instructs the user equipment to feed back a channel measurement value obtained based on Nc channel measurement resources and Ni interference measurement resources, Nc and Ni are integers greater than or equal to 1, and k=min{Nc, Ni}

In another implementation, the transceiver is further configured to: before sending the k channel measurement values, receive second instruction information sent by the network device, where the second instruction information instructs the user equipment to feed back the k channel measurement values.

Corresponding to the solutions related to FIG. 10 in the method embodiments:

The processor is configured to calculate a channel measurement value.

The transceiver is configured to send, to a network device, Ni interference measurement resource identifiers and a channel measurement value corresponding to the Ni interference measurement resource identifiers, where the channel measurement value is obtained by the user equipment through measurement performed based on at least the Ni interference measurement resources, and Ni is an integer greater than or equal to 1.

Optionally, the channel measurement value includes at least one of the following: a channel quality indicator CQI, a precoding matrix indicator PMI, and a rank indicator RI.

Optionally, the transceiver is further configured to: before sending the channel measurement value, receive third instruction information sent by the network device, where the third instruction information instructs the user equipment to feed back the channel measurement value obtained through measurement performed based on the Ni interference measurement resources.

Corresponding to the solutions related to FIG. 12 in the method embodiments:

The processor is configured to calculate a channel measurement value corresponding to Nc channel measurement resource identifiers.

The transceiver is configured to send, to a network device, the Nc channel measurement resource identifiers and the channel measurement value corresponding to the Nc channel measurement resource identifiers, where the channel measurement value is obtained by the user equipment through measurement performed based on at least the Nc channel measurement resources, and Nc is an integer greater than or equal to 1.

Optionally, the channel measurement value includes at least one of the following: a channel quality indicator CQI, a precoding matrix indicator PMI, and a rank indicator RI.

Optionally, the transceiver is further configured to: before sending the channel measurement value, receive fourth instruction information sent by the network device, where the fourth instruction information instructs the user equipment to feed back the channel measurement value obtained based on the Nc channel measurement resources.

Corresponding to the solutions related to FIG. 13 in the method embodiments:

The processor is configured to calculate k channel measurement values.

The transceiver is configured to send, to a network device, the k channel measurement values, and channel measurement resource identifiers and interference measurement resource identifiers that correspond to the channel measurement values, where each channel measurement value corresponds to m channel measurement resource identifiers and n interference measurement resource identifiers, the channel measurement value is calculated based on the channel measurement resource identifiers and the interference measurement resource identifiers that correspond to the channel measurement value, and k, m, and n each are an integer greater than or equal to 1.

Optionally, the channel measurement value includes at least one of the following: a channel quality indicator CQI, a precoding matrix indicator PMI, and a rank indicator RI.

In an implementation, the transceiver is further configured to: before sending the k channel measurement values to the network device, receive fifth instruction information sent by the network device, where the fifth instruction information instructs the user equipment to feed back a channel measurement value obtained based on Nc channel measurement resources and Ni interference measurement resources, and k is calculated based on Nc and Ni.

In another implementation, the transceiver is further configured to: before sending the k channel measurement values to the network device, receive seventh instruction information sent by the network device, where the seventh instruction information instructs the user equipment to feed back the k channel measurement values.

Optionally, the transceiver is further configured to send m and n to the network device.

Corresponding to the solutions related to FIG. 16 in the method embodiments:

The processor is configured to calculate k channel measurement values.

The transceiver is configured to send, to a network device, the k channel measurement values, and an index of a resource identifier group including channel measurement resource identifiers and interference measurement resource identifiers that correspond to the channel measurement values, where each channel measurement value corresponds to one resource identifier group, the channel measurement value is calculated based on a channel measurement resource identifier and an interference measurement resource identifier that are in the resource identifier group corresponding to the channel measurement value, and k is an integer greater than or equal to 1.

Optionally, the channel measurement value includes at least one of the following: a channel quality indicator CQI, a precoding matrix indicator PMI, and a rank indicator RI.

Optionally, the transceiver is further configured to: before sending the k channel measurement values, receive sixth instruction information sent by the network device, where the sixth instruction information instructs the user equipment to feed back a channel measurement value obtained based on Nc channel measurement resources and Ni interference measurement resources, Nc and Ni are integers greater than or equal to 1, and k is calculated based on Nc and Ni.

Figure 22:
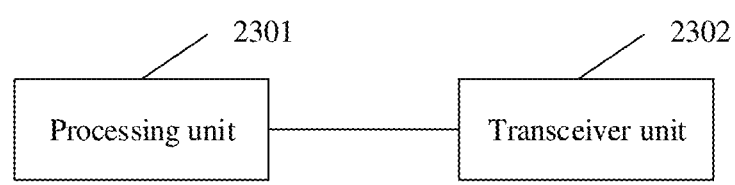
FIG. 22 is a schematic structural diagram of another user equipment according to an embodiment of the present invention.

An embodiment of the present invention further provides another user equipment. As shown in FIG. 22, the user equipment includes a processor 2301 and a transceiver unit 2302.

The transceiver unit in this embodiment may perform a function similar to that of the transceiver in the foregoing user equipment embodiment, and the processing unit may perform a function similar to that of the processor.

In the foregoing apparatus embodiments, a function of the network device or the user equipment is described by using examples only for some solutions in the method embodiments. In this application, the network device may implement some or all of the solutions in the method embodiments, and the user equipment may implement some or all of the solutions in the foregoing method embodiments. For specific details, refer to the method embodiments. Details are not described herein again.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from one computer-readable storage medium to another computer-readable storage medium. For example, the computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk solid state disk (SSD)), or the like.

What is claimed is:

1. A method, comprising:
    receiving, by a network device, k channel measurement values, k channel measurement resource identifiers, and k interference measurement resource identifiers from a user equipment;
    determining, by the network device, a resource corresponding to each channel measurement value of the k channel measurement values based on the k channel measurement resource identifiers and the k interference measurement resource identifiers, to determine resources corresponding to the k channel measurement values; and
    performing, by the network device, resource scheduling based on the k channel measurement values and the resources corresponding to the k channel measurement values;
    wherein k is an integer greater than or equal to 1; and
    wherein each of the k channel measurement values is calculated according to a respective channel measurement resource identifier and a respective interference measurement resource identifier that correspond to a respective channel measurement value.

2. The method according to claim 1, wherein each of the k channel measurement values comprises a channel quality indicator (CQI), a precoding matrix indicator (PMI), or a rank indicator (RI).

3. The method according to claim 1, wherein before receiving, by the network device, the k channel measurement values, the method further comprises:
    sending, by the network device, first instruction information to the user equipment, wherein the first instruction information instructs the user equipment to feed back channel measurement values obtained according to $N_c$ channel measurement resources and Ni interference measurement resources, $N_c$ and $N_i$ are integers greater than or equal to 1, and $k=\min\{N_c, N_i\}$.

4. The method according to claim 1, wherein before receiving, by the network device, the k channel measurement values, the method further comprises:
    sending, by the network device, second instruction information to the user equipment, wherein the second instruction information instructs the user equipment to feed back the k channel measurement values.

5. The method according to claim 1, wherein each channel measurement value respectively corresponds to one channel measurement resource identifier and one interference measurement resource identifier.

6. The method according to claim 1, wherein the resources corresponding to the k channel measurement values are only some of channel measurement resources and interference measurement resources configured for the user equipment.

7. A method, comprising:
    sending, by user equipment, a message comprising k channel measurement values, k channel measurement resource identifiers, and k interference measurement resource identifiers to a network device; and communicating with the network device according to a resource scheduled based on the k channel measurement values;

wherein k is an integer greater than 1; and wherein each of the k channel measurement values is calculated according to a respective channel measurement resource identifier and a respective interference measurement resource identifier that correspond to a respective channel measurement value, and the message indicates which of the k channel measurement resource identifiers and the k interference measurement resource identifiers corresponds to each respective k channel measurement values.

8. The method according to claim 7, wherein each of the k channel measurement values comprises a channel quality indicator (CQI), a precoding matrix indicator (PMI), or a rank indicator (RI).

9. The method according to claim 7, wherein before sending, by the user equipment, the k channel measurement values, the method further comprises:

receiving, by the user equipment, first instruction information from the network device, wherein the first instruction information instructs the user equipment to feed back channel measurement values obtained according to $N_c$ channel measurement resources and $N_i$ interference measurement resources, $N_c$ and $N_i$ are integers greater than 1, and $k=\min\{N_c, N_i\}$.

10. The method according to claim 7, wherein before sending, by the user equipment, the k channel measurement values, the method further comprises:

receiving, by the user equipment, second instruction information from the network device, wherein the second instruction information instructs the user equipment to feed back the k channel measurement values.

11. The method according to claim 7, wherein each channel measurement value respectively corresponds to one channel measurement resource identifier and one interference measurement resource identifier.

12. User equipment, comprising:

a processor, configured to calculate k channel measurement values; and a transceiver, configured to:

send a message comprising the k channel measurement values, k channel measurement resource identifiers, and k interference measurement resource identifiers to a network device, wherein k is an integer greater than or equal to 1, and wherein each of the k channel measurement values is calculated according to a respective channel measurement resource identifier and a respective interference measurement resource identifier that correspond to a respective channel measurement value, and the message indicates which of the k channel measurement resource identifiers and the k interference measurement resource identifiers corresponds to each respective k channel measurement values; and communicate with the network device according to a resource scheduled based on the k channel measurement values.

13. The user equipment according to claim 12, wherein each of the k channel measurement values comprises a channel quality indicator (CQI), a precoding matrix indicator (PMI), or a rank indicator (RI).

14. The user equipment according to claim 12, wherein the transceiver is further configured to:

before sending the k channel measurement values, receive first instruction information from the network device, wherein the first instruction information instructs the user equipment to feed back channel measurement values obtained according to $N_c$ channel measurement resources and $N_i$ interference measurement resources, $N_c$ and $N_i$ are integers greater than 1, and $k=\min\{N_c, N_i\}$.

15. The user equipment according to claim 12, wherein the transceiver is further configured to:

before sending the k channel measurement values, receive second instruction information from the network device, wherein the second instruction information instructs the user equipment to feed back the k channel measurement values.

16. The user equipment according to claim 12, wherein each channel measurement value respectively corresponds to one channel measurement resource identifier and one interference measurement resource identifier.

* * * * *